(12) United States Patent
Vitale et al.

(10) Patent No.: US 12,157,534 B2
(45) Date of Patent: Dec. 3, 2024

(54) CUSHIONED FOOTPAD WITH REINFORCING SUPPORT STRUCTURE

(71) Applicants: Nicholas John Vitale, Rancho Cucamonga, CA (US); Michael George Vitale, Rancho Cucamonga, CA (US)

(72) Inventors: Nicholas John Vitale, Rancho Cucamonga, CA (US); Michael George Vitale, Rancho Cucamonga, CA (US)

(*) Notice: Subject to any disclaimer, the term of this patent is extended or adjusted under 35 U.S.C. 154(b) by 22 days.

(21) Appl. No.: 17/407,818

(22) Filed: Aug. 20, 2021

(65) Prior Publication Data
US 2023/0054949 A1 Feb. 23, 2023

(51) Int. Cl.
*B62K 11/00* (2006.01)
*B62J 25/04* (2020.01)

(52) U.S. Cl.
CPC .............. *B62K 11/007* (2016.11); *B62J 25/04* (2020.02)

(58) Field of Classification Search
CPC ........ B62K 11/007; B62K 1/00; B62K 25/00; B62J 25/04; B62J 25/06
See application file for complete search history.

(56) References Cited

U.S. PATENT DOCUMENTS

| | | | | |
|---|---|---|---|---|
| 1,601,708 A | * | 9/1926 | Thomas | G05G 1/483 280/169 |
| 5,553,881 A | * | 9/1996 | Klassen | B62K 25/286 280/283 |
| 5,671,940 A | * | 9/1997 | Abondance | A63C 9/003 280/607 |
| 5,738,180 A | * | 4/1998 | Hofmann | B62J 25/04 74/564 |
| 5,766,051 A | * | 6/1998 | Messer | B63B 32/40 441/74 |
| 6,390,488 B1 | * | 5/2002 | Wallingsford | B62J 25/06 296/75 |
| 6,538,411 B1 | * | 3/2003 | Field | B62K 11/007 180/218 |
| 6,641,163 B2 | * | 11/2003 | Joubert des Ouches | A63C 10/285 280/607 |
| 6,797,894 B2 | * | 9/2004 | Montagnino | G01G 21/22 177/253 |
| 7,172,044 B2 | * | 2/2007 | Bouvet | A63C 17/12 180/181 |
| 7,424,927 B2 | * | 9/2008 | Hiramatsu | A63C 17/08 180/21 |
| 7,811,217 B2 | * | 10/2010 | Odien | A63C 17/12 482/34 |
| 7,827,704 B2 | * | 11/2010 | Fox | B29C 37/0032 36/154 |
| 9,101,817 B2 | * | 8/2015 | Doerksen | G01P 15/18 |
| 9,376,155 B2 | * | 6/2016 | Ying | B62K 11/007 |
| 9,452,345 B2 | * | 9/2016 | Doerksen | A63C 17/01 |
| 9,707,470 B2 | * | 7/2017 | Ma | B62K 1/00 |
| 9,962,597 B2 | * | 5/2018 | Doerksen | B62K 25/00 |

(Continued)

*Primary Examiner* — Timothy Wilhelm
(74) *Attorney, Agent, or Firm* — Law Office of Lewis Brande; Lewis M Brande

(57) ABSTRACT

A footpad for a self-balancing vehicle comprising a low durometer elastomeric material body for enhanced ride comfort and a support structure comprising at least one stiffer reinforcing member having at least a portion embedded in the elastomeric material body and in close proximity to the elastomeric material body edges for improved footpad response and fixation integrity.

18 Claims, 20 Drawing Sheets

(56) References Cited

U.S. PATENT DOCUMENTS

| | | | | |
|---|---|---|---|---|
| 9,999,827 B2* | 6/2018 | Wood | ................... | A63C 17/12 |
| 10,010,784 B1* | 7/2018 | Doerksen | ............ | A63C 17/0046 |
| 10,058,765 B2* | 8/2018 | Ma | ................... | A63C 17/004 |
| 10,167,037 B2* | 1/2019 | Ying | ................... | B62D 51/02 |
| 10,207,764 B2* | 2/2019 | Li | ................... | B62K 11/14 |
| 10,343,050 B2* | 7/2019 | Doerksen | ............ | B62K 25/00 |
| 10,343,051 B2* | 7/2019 | Doerksen | ............ | G05D 1/0891 |
| 10,369,453 B2* | 8/2019 | Bigler | ................... | B60L 50/52 |
| 10,421,006 B1* | 9/2019 | Li | ................... | A63C 17/002 |
| 10,456,658 B1* | 10/2019 | Doerksen | ............ | A63C 17/265 |
| 10,696,348 B2* | 6/2020 | Ying | ................... | B62K 11/007 |
| 10,730,577 B2* | 8/2020 | Chen | ................... | B62J 43/28 |
| 10,933,937 B2* | 3/2021 | Shang | ................... | B62K 11/007 |
| 11,045,712 B1* | 6/2021 | Orehek | ................... | A63C 17/12 |
| 11,123,629 B1* | 9/2021 | Doerksen | ............ | A63C 17/12 |
| 11,130,543 B2* | 9/2021 | Ying | ................... | B62D 51/02 |
| 11,136,084 B2* | 10/2021 | Shang | ................... | B62J 6/015 |
| 11,260,905 B2* | 3/2022 | Ying | ................... | B62D 51/02 |
| 11,273,364 B1* | 3/2022 | Doerksen | ............ | A63C 17/12 |
| 11,299,059 B1* | 4/2022 | De La Rua | ............ | B60L 15/20 |
| 11,433,294 B2* | 9/2022 | Woolson | ............ | A63C 17/08 |
| 11,479,311 B2* | 10/2022 | Doerksen | ............ | B62D 37/04 |
| 11,524,743 B2* | 12/2022 | Ke | ................... | A63C 17/04 |
| 11,590,409 B2* | 2/2023 | Doerksen | ............ | B62J 45/41 |
| 2007/0254789 A1* | 11/2007 | Odien | ................... | A63B 26/003 |
| | | | | 482/92 |
| 2018/0257732 A1* | 9/2018 | Chen | ................... | B60K 7/0007 |
| 2019/0168102 A1* | 6/2019 | Doerksen | ............ | G05D 1/0891 |
| 2019/0337585 A1* | 11/2019 | Ying | ................... | B62M 6/90 |
| 2020/0282293 A1* | 9/2020 | Turner | ................... | A63C 17/12 |

* cited by examiner

Modified
Section A-A

CUSHIONED FOOTPAD WITH REINFORCING SUPPORT STRUCTURE

FIELD OF THE INVENTION

The present invention relates to footpads, and more particularly to footpads for self-balancing vehicles.

BACKGROUND OF THE INVENTION

Footpads affixed to self-balancing vehicles serve as a support system and an operational interface. In both cases the rider's weight is transferred through the footpad to the vehicle. As a support system, footpad design can influence foot slip resistance and ride comfort. As an operational interface, when slight foot position changes or weight distribution adjustments affect vehicle movement, footpad design can influence vehicle control and ride stability.

High performance footpad designs claim to offer greater slip resistance, ride comfort, control, and stability or some combination of these desirable benefits through unique geometric features or material selection. Footpad surfaces may be contoured to better engage the rider's foot and reduce the possibility of slippage. Contoured footpad examples include those with concave or convex surfaces as well as footpads with higher rear portions, commonly referred to as kicks. Footpads may also be manufactured with a textured surface, coated with a slip resistant material, or covered with a slip resistant tape to improve slip resistance.

Footpad material selection and, more specifically, material hardness or durometer may affect ride comfort, control and stability. Firmer footpad materials such as wood, plastic and high durometer elastomers do not easily compress or absorb impact. These higher hardness footpad materials may offer greater ride control and stability but are less comfortable.

Softer materials such as low durometer elastomers provide more cushion under foot, dampen vehicle vibrations more effectively and reduce shock transmission from vehicle impacts. These lower hardness footpad materials may deliver a more comfortable ride but their inherently lower stiffness and ease of deformation under load can compromise vehicle control and ride stability. Lower hardness footpad materials can easily lift off the vehicle mounting surface and allow dirt and debris to accumulate under the footpad.

Footpad material selection may also affect fixation integrity. Footpad materials such as wood, plastic and high durometer elastomers are typically more resistant to fastener pull out and edge tear out. Conversely softer footpad materials such as low durometer elastomers are prone to pull out and tear out fastener related failures.

The object of the present invention is to provide a more comfortable footpad for riders of self-balancing vehicles without sacrificing ride control, stability, lift off or fixation integrity.

SUMMARY OF THE INVENTION

Embodiments of the present invention relate to footpads for self-balancing vehicles. At least a portion of the footpad top surface is configured to receive the rider's left or right foot and at least a portion of the footpad bottom surface is in contact with the self-balancing vehicle mounting surface.

The footpad comprises a low durometer elastomeric material body for enhanced ride comfort and a support structure having at least a portion embedded in the elastomeric material body for greater ride control and stability as well as footpad fixation integrity.

The low durometer elastomeric material easily deforms under the rider's weight thereby delivering a desirable soft, comfortable feel. The low durometer material also effectively dampens vehicle vibrations and absorbs vehicle impact forces for additional ride comfort.

The addition of a support structure comprising at least one stiffer reinforcing member and at least a portion disposed in a region near the elastomeric material body perimeter reduces perimeter deformation. The rider in turn experiences a firmer response when pressing against elastomeric material body perimeter portions. The firm perimeter response allows the rider to more confidently influence vehicle movement through foot positioning and weight distribution for a greater ride control and stability.

The support structure's proximity to the elastomeric material body perimeter stiffens the footpad and reduces footpad lift off from the vehicle mounting surface and mitigates dirt and debris accumulation under the footpad.

In another aspect of the present invention the footpad may comprise an interior portion comprising only low durometer elastomeric material through the thickness to provide a softer, more comfortable footpad interior.

In another aspect of the present invention the footpad may comprise fastener apertures to accommodate fasteners used to affix the footpad to the vehicle mounting surface. Fastener apertures may pass through the elastomeric material body, a reinforcing member or both the elastomeric material body and a reinforcing member. A portion of a reinforcing member may span two or more fastener apertures and be effectively constrained against the vehicle mounting surface by fasteners installed adjacent to the reinforcing member. Fasteners passing through a stiffer reinforcing member and in some cases adjacent to a reinforcing member are less likely to pull out or tear out from the footpad.

In another aspect of the present invention the support structure may comprise a plurality of reinforcing members and at least a portion of the support structure is embedded in the elastomeric material body and in close proximity to the elastomeric material body perimeter for a firm perimeter response. The plurality of reinforcing members may be configured to leave a portion of the footpad interior comprising only low durometer elastomeric material through the thickness for greater ride comfort.

In another aspect of the present invention the support structure may be in close proximity to the entire elastomeric material body perimeter or only a portion of the elastomeric material body perimeter. As an example of the latter, the support structure may comprise a single u-shaped reinforcing member or a plurality of reinforcing members arranged into a u-shape having an interior opening between the u-shape legs and an open end facing the footpad front. The u-shaped support structure provides a footpad having a firm perimeter response, greater fixation integrity on the back and opposing sides, and a soft, comfortable interior portion. In other examples a portion of the support structure may be in close proximity to the footpad back, front, opposing sides, corners or any combination thereof In another aspect of the present invention a portion of the footpad may protrude below the bottom surface. The front edge protrusion prevents dirt and debris from the wheel from accumulating under the footpad on some self-balancing vehicles.

In another aspect of the present invention threaded members such as T-Nuts may be embedded in the elastomeric material body or threaded inserts may be press fit into the support structure to provide hard attachment points for fasteners used to affix the footpad to the vehicle.

In another aspect of the present invention a reinforcing member may be plastically deformed to alter the footpad shape.

DETAILED DESCRIPTION

Figure 1:
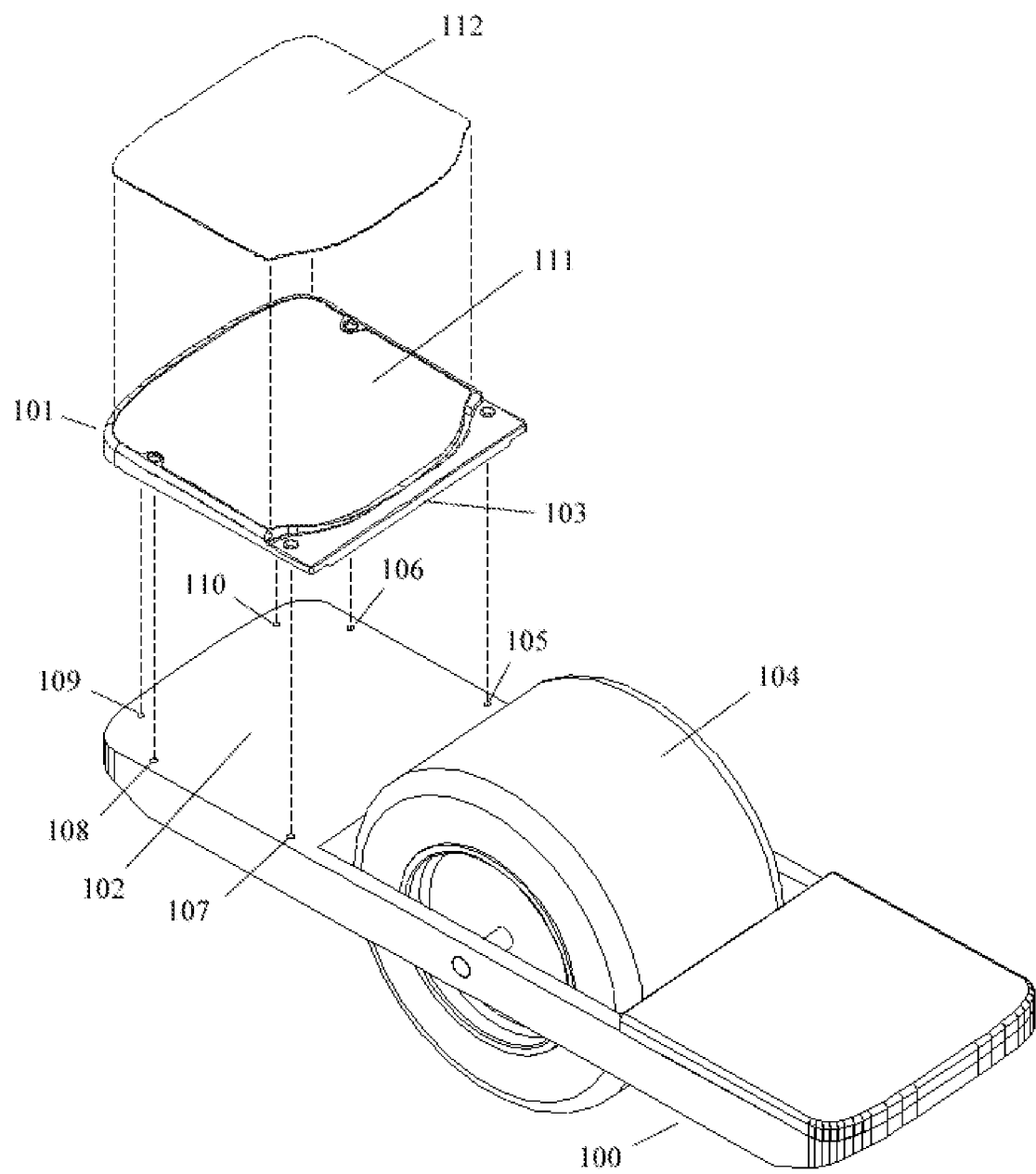
FIG. 1 is an exploded installation view of a footpad embodiment on a self-balancing vehicle.

FIG. 1 is an exploded installation view of a preferred embodiment of the footpad on a self-balancing vehicle 100 example. Footpad 101 is positioned on the vehicle mounting surface 102 with the footpad front edge 103 facing the wheel 104 and secured to the vehicle mounting surface with threaded fasteners (not shown). Fasteners pass through the footpad and screw into threaded apertures 105-108 in the vehicle mounting surface. Other fasteners pass through the vehicle mounting surface apertures 109 and 110 and screw into the footpad.

The footpad top surface 111 may be manufactured with a textured surface or an adhesive backed grip tape 112 may be affixed to top surface 111 for greater slip resistance when the rider's left or right foot bears against the footpad. Grip tape 112 may comprise an aggressive grit or sandpaper-like surface to reduce vehicle rider foot slippage. In other embodiments a spray on grip consisting of a binder and grit particles may be disposed on top surface 111 for extra slip resistance.

In other embodiments the footpad may comprise different fastener attachment configurations or may be adhesively bonded to the self-balancing vehicle. In other embodiments the footpad may be smaller or larger than the self-balancing vehicle frame or mounting surface.

Figure 2:
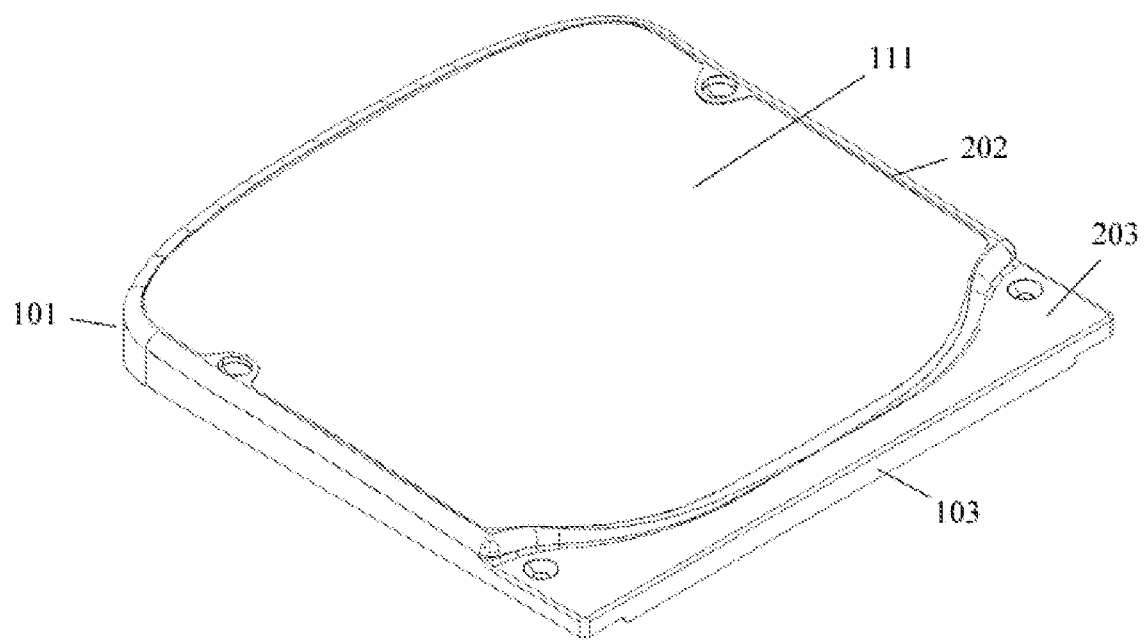
FIG. 2 is an isometric top view of a footpad embodiment.

Referring to FIG. 2, top surface 111 may be recessed slightly to accommodate the grip tape thickness. The grip tape, when installed, may be flush with the raised lip 202 and adjacent elastomeric material body portions not covered by grip tape.

A portion of the footpad top 203 near the front 103 is a low profile, substantially flat section configured to cover the front of the vehicle mounting surface. In other embodiments the entire footpad top surface may be contoured.

Figure 3:
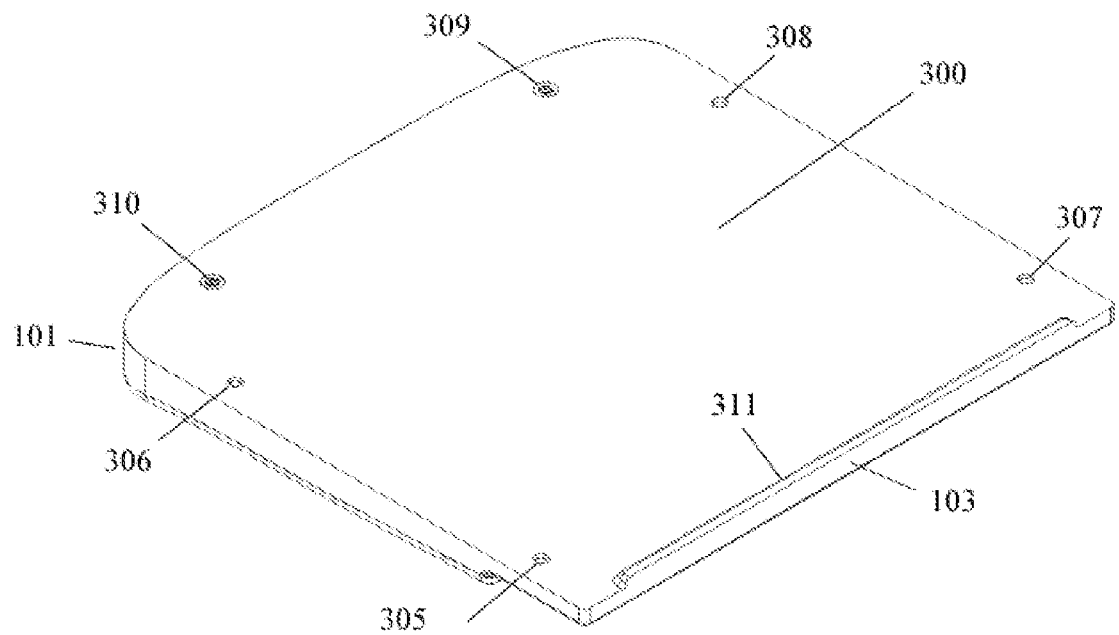
FIG. 3 is an isometric bottom view of a footpad embodiment.

FIG. 3 is an isometric bottom view of footpad 101. Bottom surface 300 is a substantially flat planar surface configured to mate with vehicle mounting surface 102. In other embodiments, portions of bottom surface 300 may be planar, planar and contoured, or contoured to mate with similarly shaped vehicle mounting surfaces.

Footpad fastener apertures 305-308 align with vehicle mounting surface threaded apertures 105-108. Fasteners passing through the vehicle mounting surface at apertures 109 and 110 screw into threaded inserts 309 and 310 in the footpad.

Figure 4:
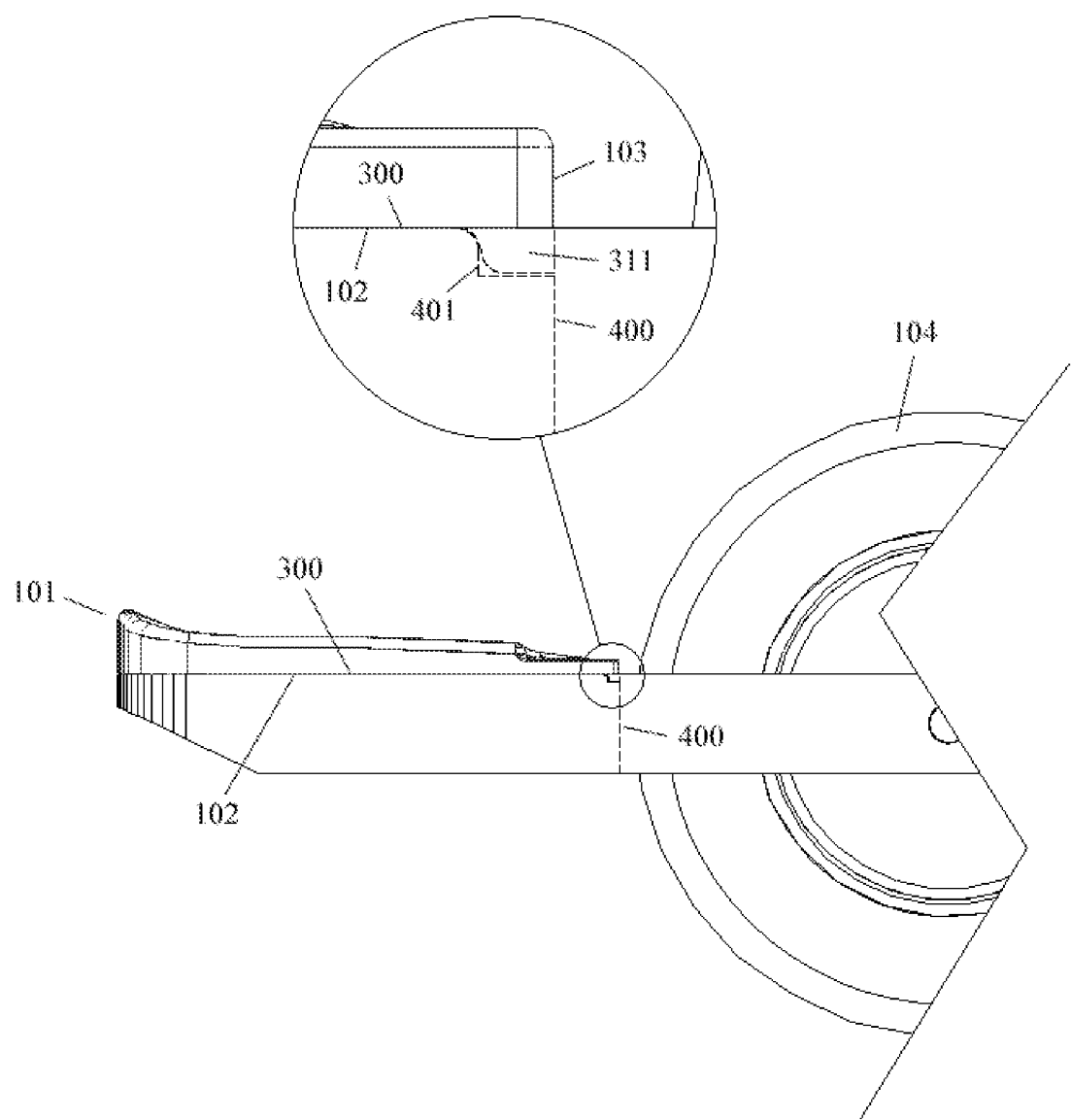
FIG. 4 is a side view of a footpad embodiment installed on a self-balancing vehicle depicting a footpad debris block.

In a preferred embodiment a portion of the footpad, debris block 311, protrudes below bottom surface 300 along front edge 103. As illustrated in FIG. 4, debris block 311 fits into recessed step 401 located along the vehicle frame face 400. Foreign matter is commonly sprayed against vehicle frame face 400 and footpad front 103 when operating the self-balancing vehicle. Debris block 311 reduces accumulation of foreign matter between the footpad bottom surface 300 and vehicle mounting surface 102. The protruding footpad portion may be part of the elastomeric material body or may be part of the support structure or both. In other embodiments a portion of the footpad may overhang the vehicle frame face 400.

In a preferred embodiment footpad 101 comprises an elastomeric material body with a durometer of approximately 50 Shore A but may be between 20 Shore OO and 90 Shore A.

The Shore OO durometer scale ranges from 0 to 100 and provides a measure of very soft to medium hard elastomeric material hardness. The Shore A durometer scale, which also ranges from 0 to 100 , overlaps part of the Shore OO scale and provides a measure of soft to very hard elastomeric material hardness. Both durometer scales are used to define the elastomeric material body durometer range because no one scale has sufficient breadth. The stated range of 20 Shore OO to 90 Shore A includes elastomeric materials with a durometer of 20 to 100 Shore OO and elastomeric materials with a durometer of 0 to 90 Shore A.

Desirable footpad performance properties such as cushion under foot, vibration damping and impact absorption typically improve as the elastomeric material's durometer decreases. Other desirable footpad properties such as durability, fastener retention and control associated with less perimeter deformation tend to improve as elastomeric material's durometer increases. In other embodiments the elastomeric material durometer may be between 10 Shore A and 80 Shore A for a better balance of these desirable properties near each range endpoint. In other embodiments the elastomeric material durometer may be between 35 Shore A and 65 Shore A for an optimal balance of these desirable properties throughout the durometer range.

In a preferred embodiment the elastomeric material is a polyurethane rubber having a durometer of approximately 50 Shore A. The polyurethane rubber may be a thermoset or thermoplastic polyurethane rubber. Thermoset polyurethane rubbers typically comprise two parts mixed together and deareated (vacuum degassed) prior to casting or injecting the resin into a mold cavity with the desired elastomeric material body shape. Thermoplastic polyurethane rubbers are commonly heated and injected into a mold cavity with the desired elastomeric material body shape.

In other embodiments the elastomeric material may be selected from a group including but not limited to natural, synthetic polyisoprenes (SN), styrene-butadienes (SB), styrene-butadiene-styrenes (SBS), polyurethanes, silicones and viable copolymers thereof.

Pins located in the mold cavity may be used to form fastener apertures in the elastomeric material body during the casting or injection. In some embodiments threaded members such as T-nuts configured to receive fasteners may be mounted on threaded pins in the mold cavity before casting or injecting the elastomeric material.

In other embodiments the elastomeric material body may be produced by overmolding a first elastomeric material component with a second elastomeric material component to produce the final elastomeric material body shape.

Figure 5:
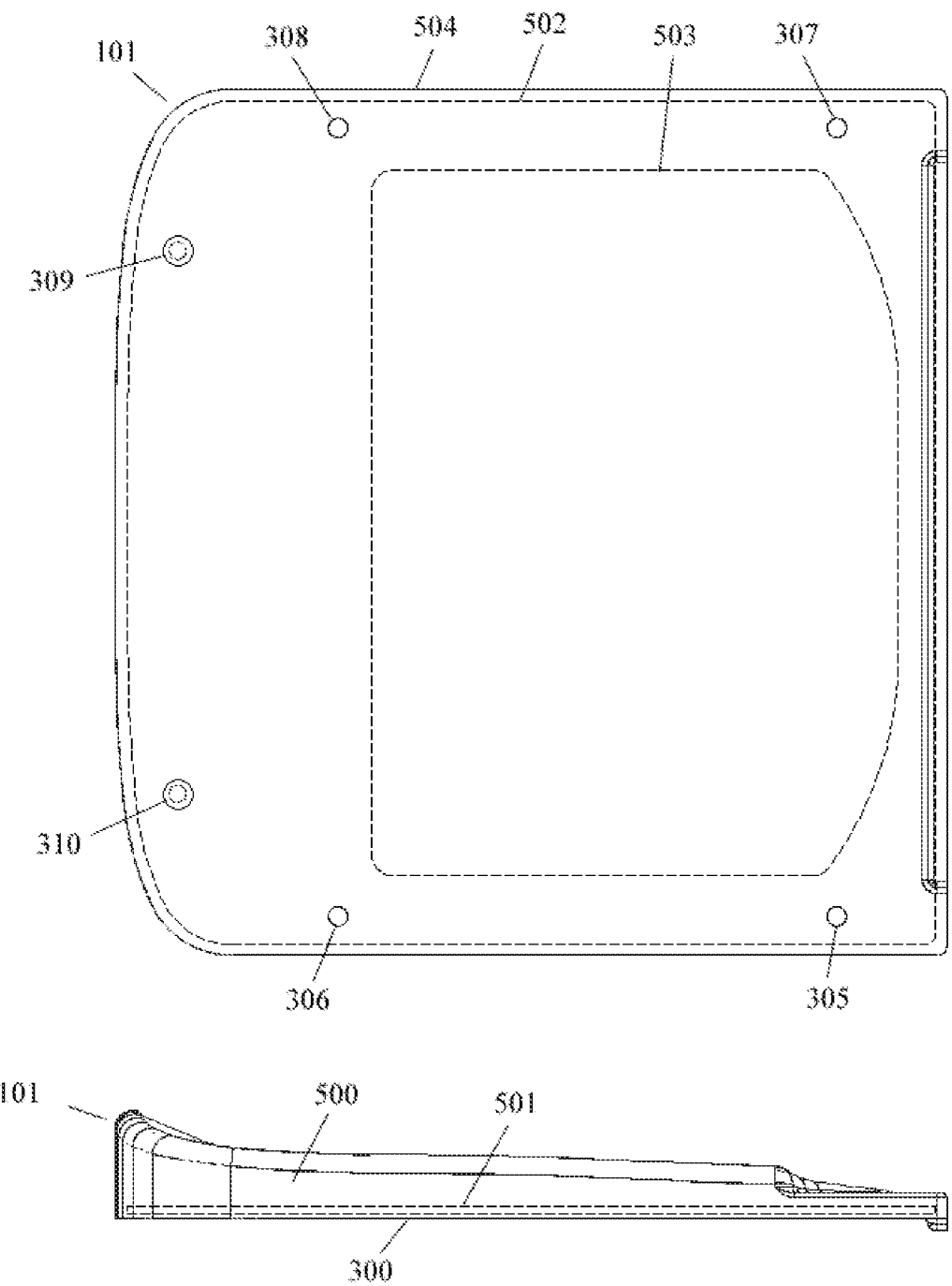
FIG. 5 is a bottom and side view of a footpad embodiment depicting a single reinforcing member support structure disposition relative to the elastomeric material body.

Referring to FIG. 5, a side and bottom view of a preferred embodiment, footpad 101 further comprises a single reinforcing member support structure embedded in the elastomeric material body 500 as illustrated by hidden lines 501 (fastener aperture 305-310 detail not shown for clarity), 502 and 503. The support structure is disposed near bottom surface 300 as illustrated in a preferred footpad embodiment side view but may have a different thickness disposition in other embodiments. The support structure is in close proximity to the elastomeric material body perimeter 504. The support structure may also comprise an interior aperture defined by hidden line 503, fastener apertures 305-308 and threaded inserts 309-310.

In a preferred embodiment the support structure is a single reinforcing member comprising a plate of an aluminum alloy such as 6061 with a Modulus of Elasticity of approximately 68,950 MPa (10,000,000 psi). In other embodiments the reinforcing member material Modulus of Elasticity is greater than the elastomeric material Modulus of Elasticity and may be selected from a group including but not limited to metal, fiber reinforced composite, wood, reinforced and unreinforced plastic, and rubber materials.

The reinforcing member material Modulus of Elasticity is preferably at least five times the elastomeric material Modulus of Elasticity. For example, a footpad embodiment may comprise an elastomeric material body with a 50 Shore A durometer and a 1.71 MPa (250 psi) Modulus of Elasticity and a support structure comprising a reinforcing member such as a harder rubber with a 90 Shore A durometer and a 8.97 MPa (1300 psi) Modulus of Elasticity.

In other embodiments the support structure may be a single reinforcing member or a plurality of reinforcing members. Support structures comprising a plurality of reinforcing members may include reinforcing members comprising different materials, for example a support structure comprising a reinforced plastic reinforcing member and a metal reinforcing member.

The support structure may be located and held in the mold cavity during elastomeric material casting or injection with pins used to form fastener apertures, pins used to position threaded members or other cavity fixation means.

Figure 6:
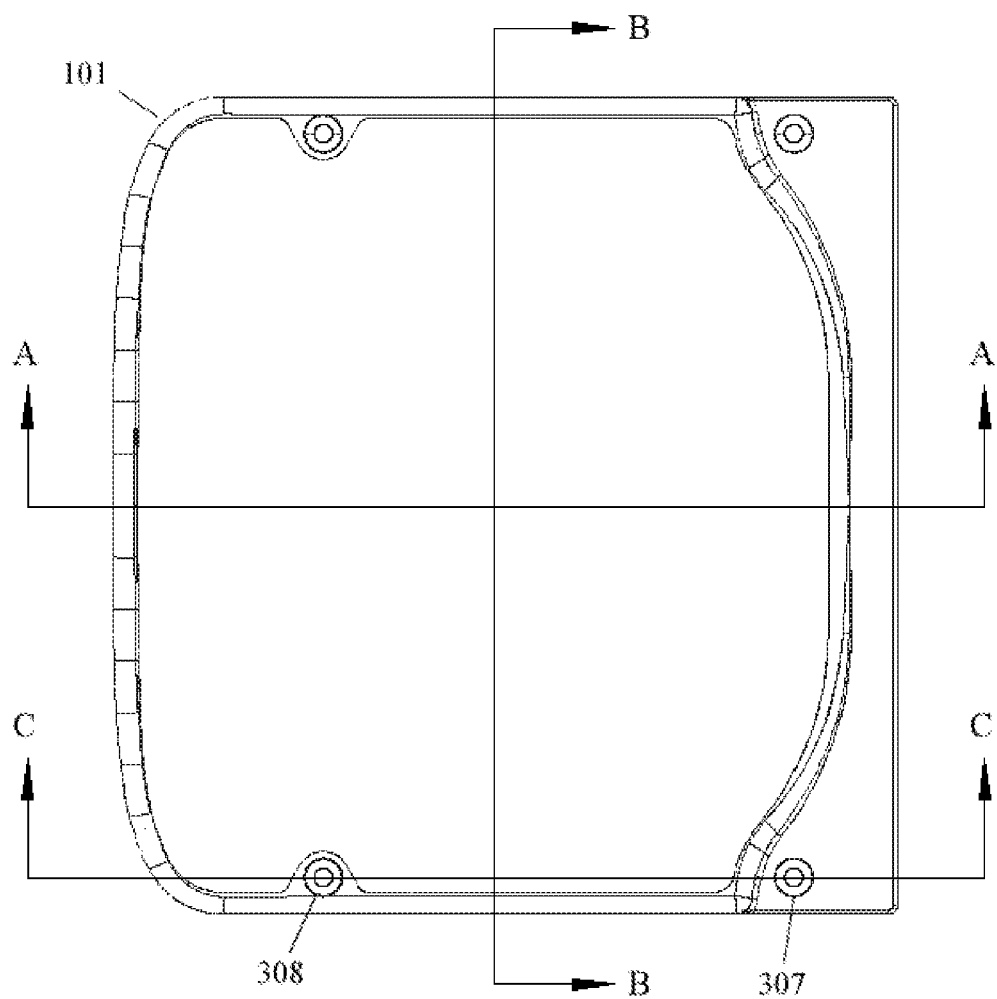
FIG. 6 is a top view of a footpad embodiment defining cross section locations.
Figure 7:
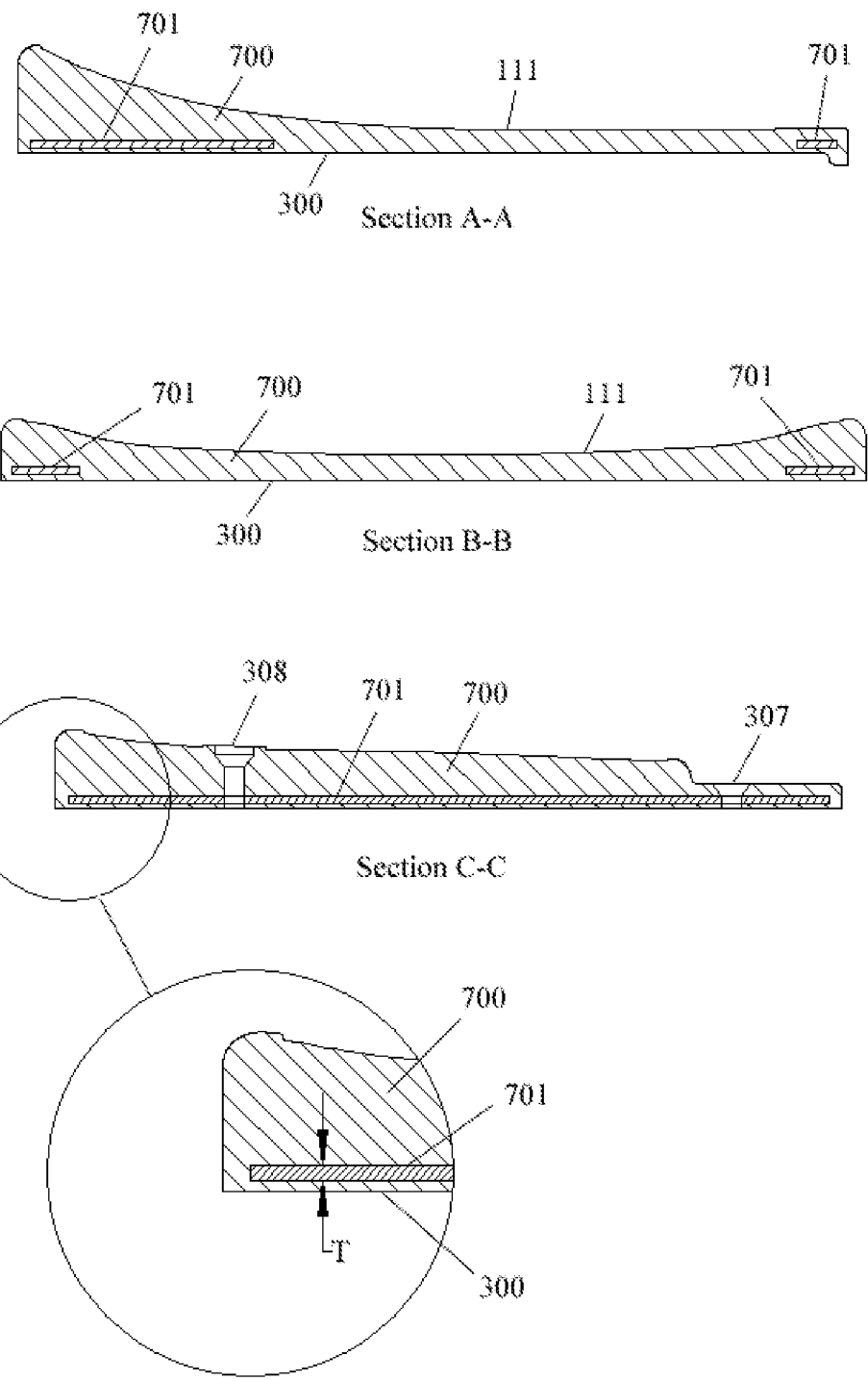
FIG. 7 are cross section views of a footpad embodiment.

Referring to FIGS. 6 and 7, Section A-A illustrates the contoured top surface 111 of footpad 101 and disposition of support structure 701 in elastomeric material body 700. The thickest footpad section is at the rear, a section commonly called the "kick". The footpad thickness gradually decreases from the rear to the front. In other embodiments the footpad may be thicker in the rear and front and gradually thins toward the middle.

Section B-B also illustrates the footpad contoured top surface 111 and the support structure disposition. The footpad thickness is greater on each side and gradually thins toward the middle.

Section C-C is a cross section view showing fastener apertures 307 and 308 passing through both the elastomeric material body 700 and support structure 701. Fastener pull out and tear out failures are reduced when fasteners pass through both the elastomeric material body and a stiffer reinforcing member. Fastener apertures 307 and 308 comprise a countersunk portion to accommodate an installed fastener head. In other embodiments the fastener head may be proud of the elastomeric material body top surface. The single reinforcing member support structure thickness T is approximately 2.0 mm (0.08 in) but may be between 0.5 mm (0.02 in) and 12.7 mm (0.50 in) thick. In other embodiments the support structure may comprise a reinforcing member having variable thickness or a plurality of reinforcing members of different thickness.

Figure 8:
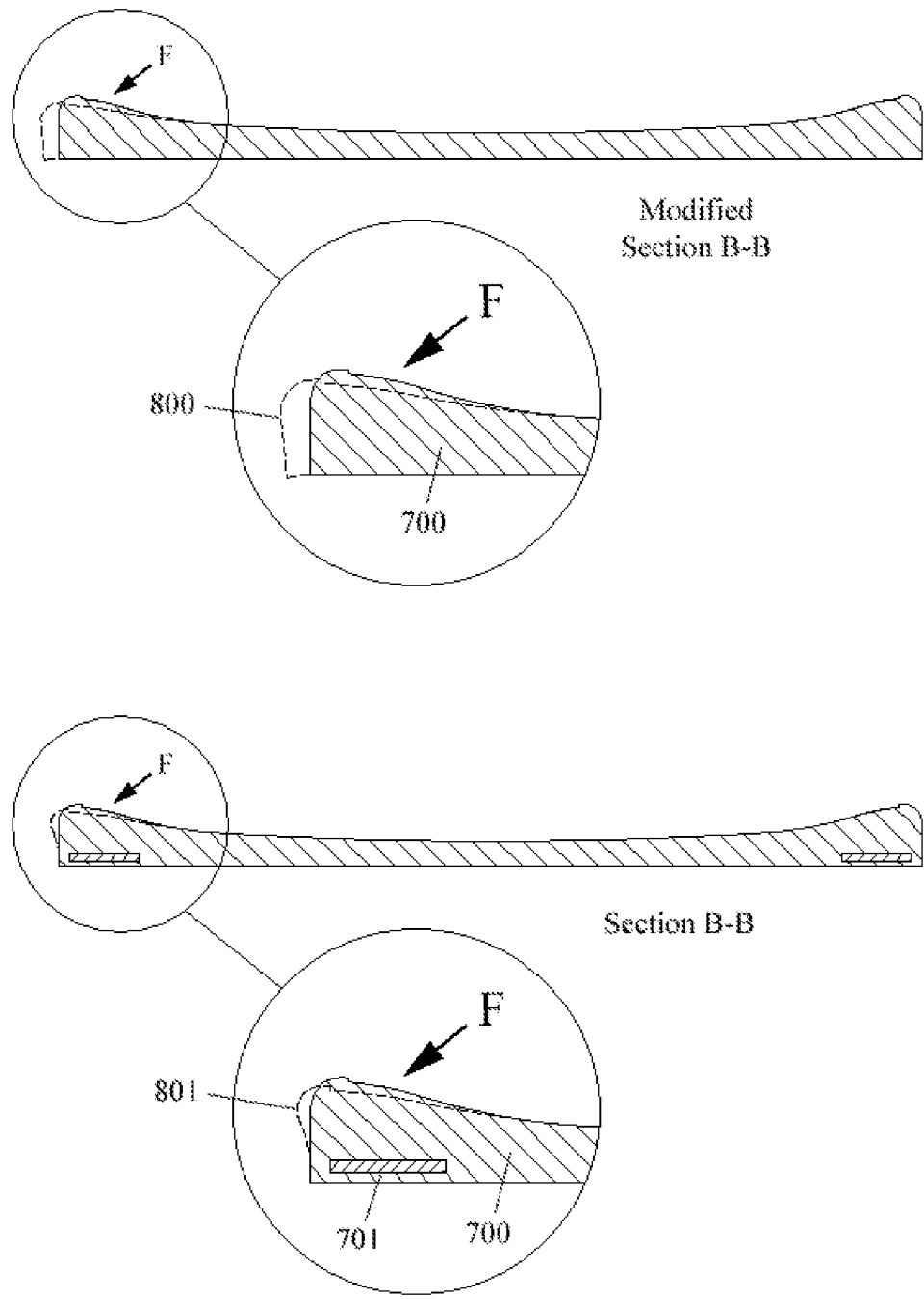
FIG. 8 are cross section views of a footpad embodiment depicting elastomeric material body edge deformation due to an applied force.

A self-balancing vehicle rider frequently applies force near a footpad edge to control vehicle movement. Referring to FIG. 8, a low durometer and inherently low stiffness elastomeric material body without a support structure would easily deform due to an applied force F as illustrated by the deformed dashed line 800 in the enlarged Modified Section B-B detail. This excessive lateral deformation is highly undesirable as it can result in a loss of vehicle control.

The presence of a support structure in the elastomeric material body and the proximity of the support structure to the elastomeric material body perimeter reduces deformation, particularly lateral deformation as shown by deformed dashed line 801 in the enlarged Section B-B detail. Less edge deformation produces a firmer response and results in better ride control and stability. The support structure proximity to the elastomeric material body edge also increases local bending stiffness and reduces footpad lift off from the vehicle mounting surface.

Figure 9:
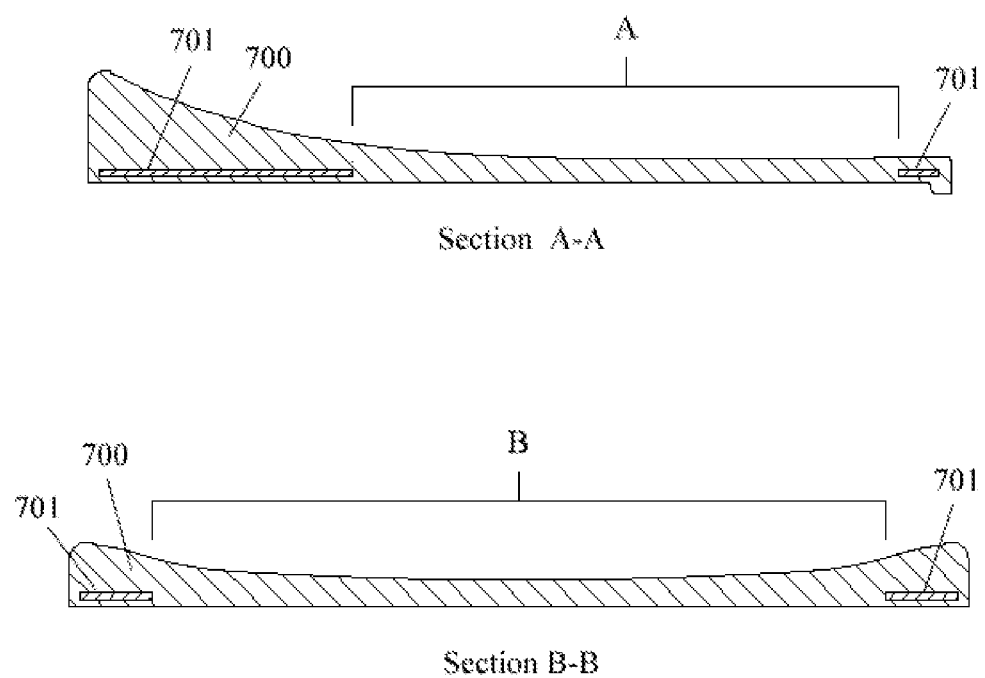
FIG. 9 are cross section views of a footpad embodiment depicting footpad regions with elastomeric material through the thickness.

With continued reference to Sections A-A and B-B in FIG. 9, portions of the footpad interior may comprise only elastomeric material through the thickness such as spans A and B. The absence of support structure portions in the footpad interior allows the elastomeric material body to compress easily and provide a softer, more comfortable ride. In other embodiments the support structure may not comprise an interior aperture and the elastomeric material thickness above or below the support structure may be increased to create a more comfortable footpad interior.

Figure 10:
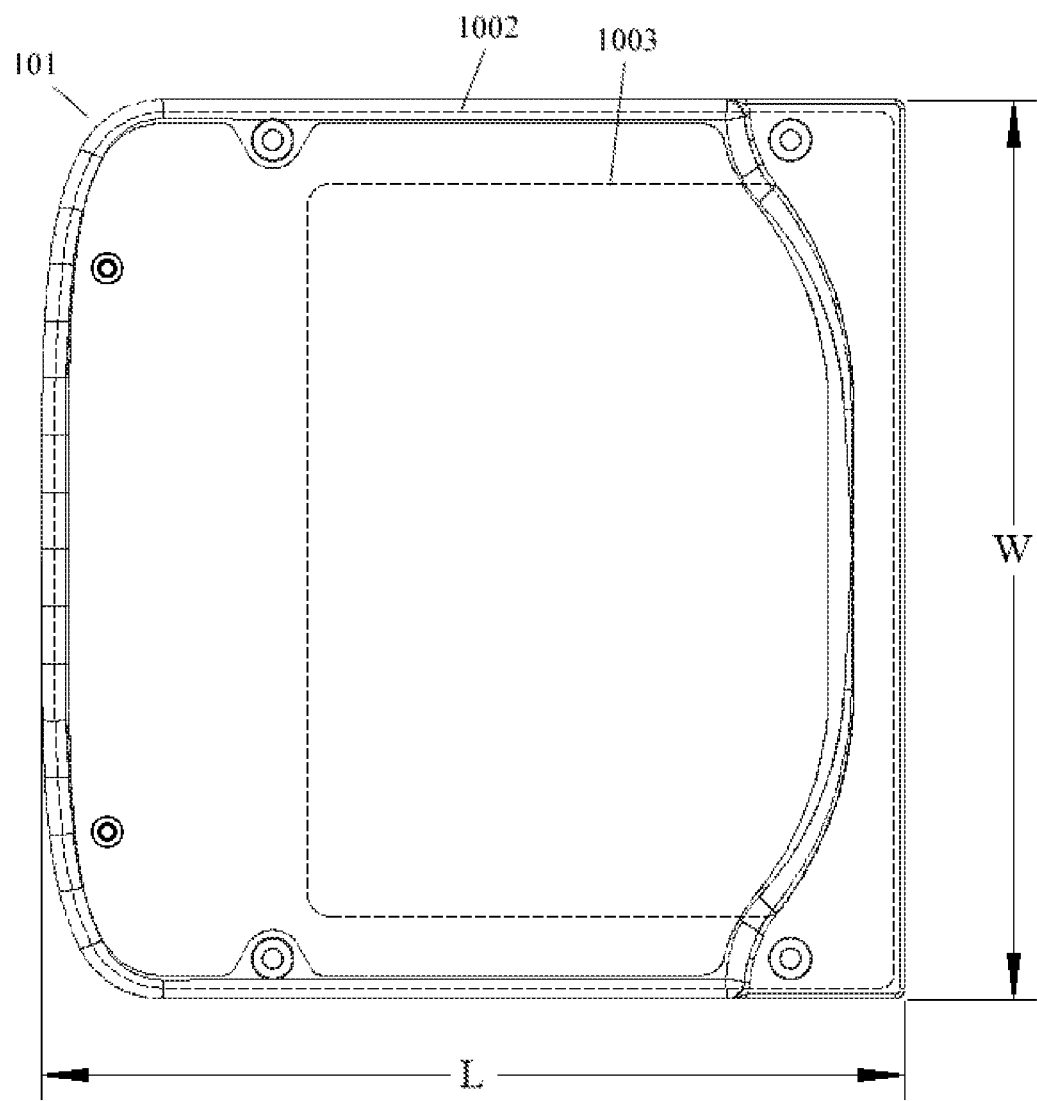
FIG. 10 is a top view of a footpad embodiment depicting the disposition of a single reinforcing member support structure.

FIG. 10 is a top view illustration of a preferred footpad embodiment. The elastomeric material body of footpad 101 has a plan view (same as top view) width W of approximately 240.7 mm (9.48 in) and a plan view length L of approximately 230.8 mm (9.09 in). In other embodiments the elastomeric material body plan view width and length dimensions may differ to fit different self-balancing vehicles and either dimension may be between 152.4 mm (6.00 in) and 508.0 mm (20.00 in). In some embodiments the elastomeric material body plan view length or width may be smaller or larger than the vehicle mounting surface or frame plan view perimeter.

The elastomeric material body minor dimension, a term that will be discussed later, is defined as the smaller of the elastomeric material body plan view width W and length L dimensions. If the footpad is not generally rectangular in shape the minor dimension is the minimum dimension across the elastomeric material body plan view perimeter.

FIGS. 11A-L are top views of some possible support structure embodiments for the footpad 101 example illustrated in FIG. 10. Support structure 1100 (FIG. 11A), a preferred embodiment, comprises a single reinforcing member 1101 having an interior aperture 1102, the interior aperture plan view area is approximately 278.1 cm$^2$ (43.1 in$^2$). Reinforcing member 1101 further comprises fastener apertures 1105-1108 which align with fastener apertures in the elastomeric material body of footpad 101. Threaded inserts (not shown) are press fit into apertures 1109 and 1110 and receive fasteners screwed into footpad 101.

Figure 11A:
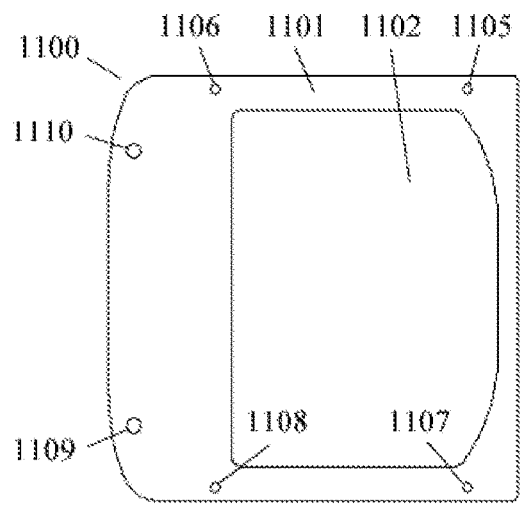
FIGS. 11A-L are top views of support structure embodiments having single and a plurality of reinforcing members.
Figure 11B:
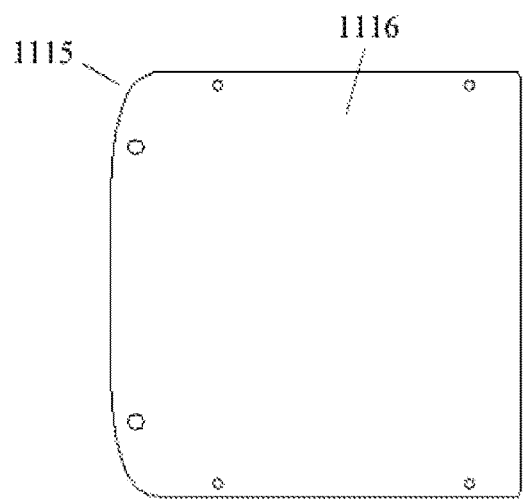
Figure 11C:
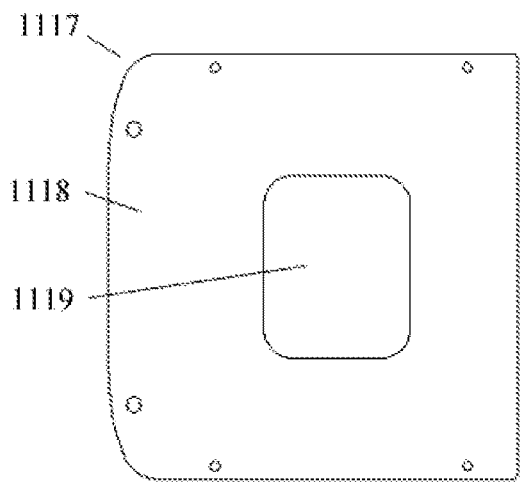
Figure 11D:
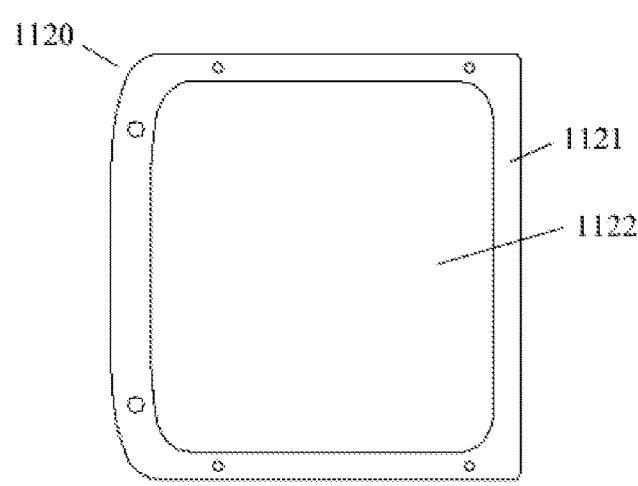

FIGS. 11B-11D illustrate similarly shaped support structure embodiments having single reinforcing members and similar fastener and threaded insert apertures. Support structure 1115 comprises a reinforcing member 1116 with no interior aperture. Support structures 1117 and 1120 comprise reinforcing members having small and large interior apertures 1119 and 1122 respectively. Reinforcing member 1118 interior aperture 1119 has a plan view area of approximately 78.1 cm$^2$ (12.1 in$^2$). Reinforcing member 1121 interior aperture 1122 has a plan view area of approximately 376.8 cm$^2$ (58.4 in$^2$). Support structure 1115 produces a firmer footpad interior with less cushion. Support structures 1117, 1110 and 1120, with progressively larger interior apertures, produce footpads with progressively softer and more comfortable interiors. In other embodiments the reinforcing member interior aperture plan view area and resulting footpad interior portion having only elastomeric material through the thickness may be between 20.0 cm$^2$ (3.1 in$^2$) and 645.0 cm$^2$ (100.0 in$^2$).

Figure 11E:
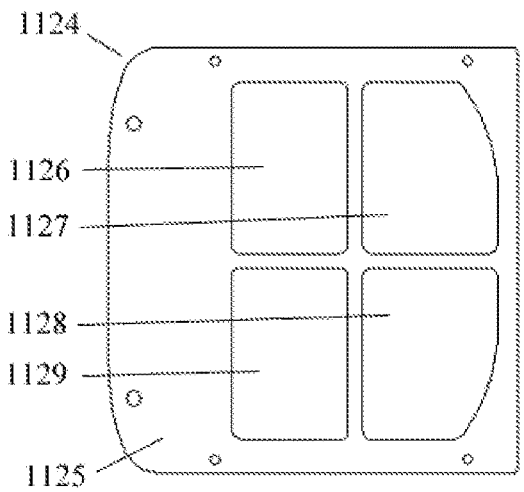

FIG. 11E illustrates support structure 1124 comprising reinforcing member 1125 having a plurality of interior apertures 1126-1129, the interior apertures have a total plan view area of approximately 250.6 cm$^2$ (38.8 in$^2$). Support structures comprising a plurality of interior apertures may reduce interior elastomeric material body lateral deformation while retaining most of the desirable through the thickness compression compared to support structures having a single large interior aperture.

Figure 11F:
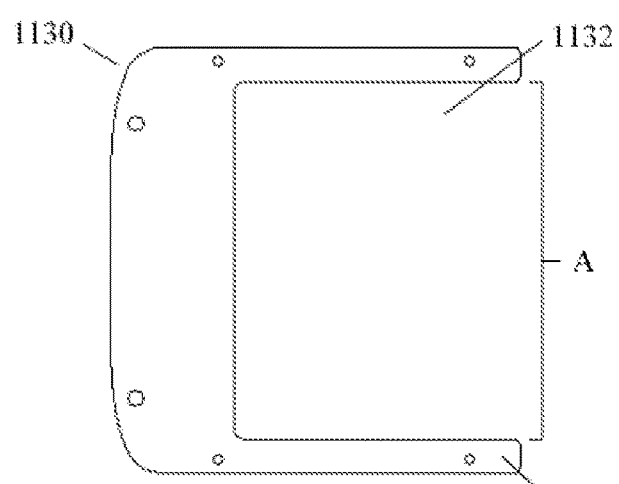

Support structure 1130 comprises a u-shaped reinforcing member 1131 with open end A facing the footpad front edge (FIG. 11F). The plan view area of interior opening 1132 between the u-shaped reinforcing member legs is approximately 307.1 cm$^2$ (47.6 in$^2$). Support structure 1130 provides a firm elastomeric material body perimeter response along the footpad back and opposing sides while the elastomeric material through the thickness between the opposing legs provides a soft, comfortable footpad interior portion. Other support structure embodiments may provide reinforcement along portions of the footpad back, front, opposing sides, corners or combinations thereof.

Figure 11G:
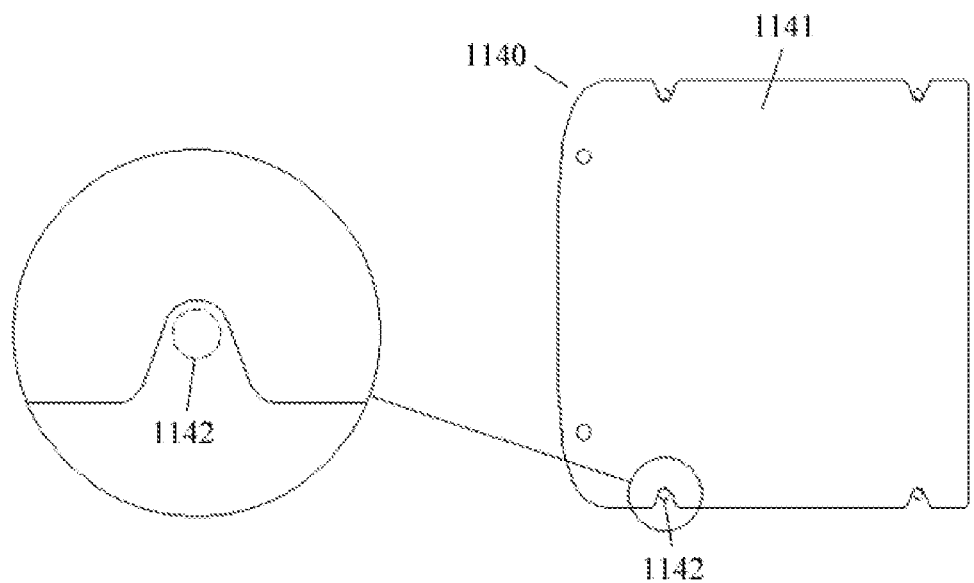
Figure 11H:
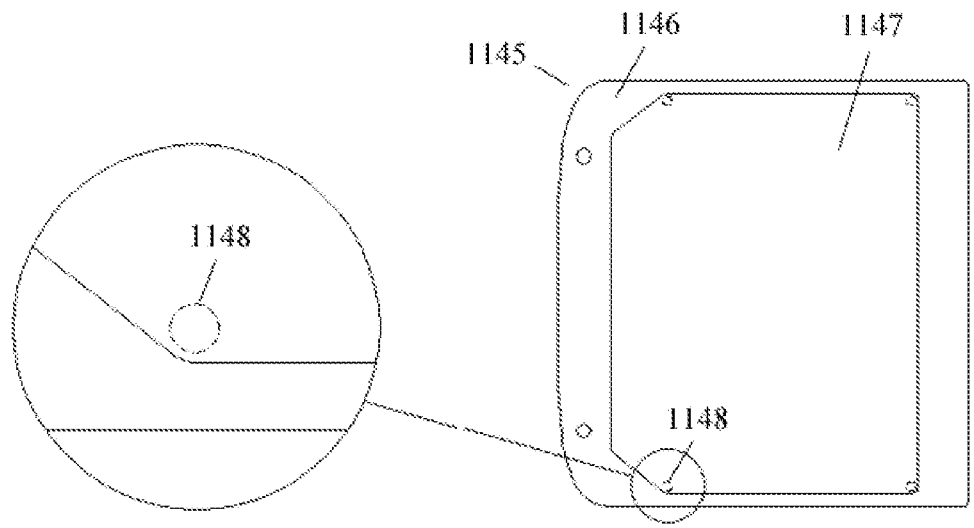

In other embodiments some of the fasteners used to affix the footpad to the self-balancing vehicle may pass through the elastomeric material body and adjacent to the reinforcing member in two or more locations to effectively constrain the reinforcing member and footpad. FIGS. 11G-H illustrate two possible examples in support structures 1140 and 1145 comprising reinforcing members 1141 and 1146 respectively, each reinforcing member having threaded insert apertures but no fastener apertures.

Instead four fasteners are installed adjacent reinforcing members 1141 and 1146 and prevent reinforcing member and footpad movement. For example, a portion of the installed fastener at locations 1142 and 1148 depicted by dashed lines, can bear against the reinforcing member and limit its movement. In combination with three other installed fasteners, the reinforcing members are unable to move front to back or side to side. Furthermore, the head of each installed fastener overlaps a portion of the reinforcing member to constrain the footpad against the vehicle mounting surface and prevent lift off.

In other embodiments the footpad may be affixed to the self-balancing vehicle using any combination of fasteners passing through the elastomeric material body only, through or adjacent to a reinforcing member only, or through the elastomeric material body and through or adjacent to a reinforcing member.

Figure 11I:
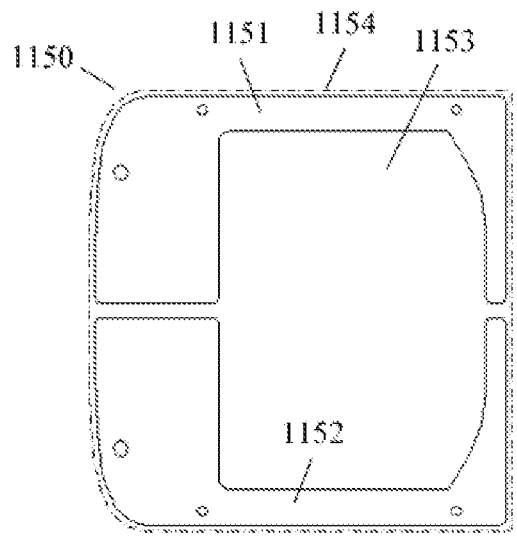
Figure 11J:
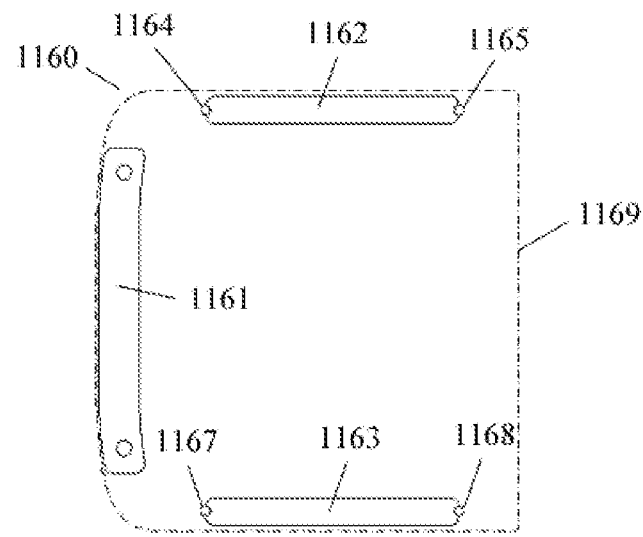
Figure 11K:
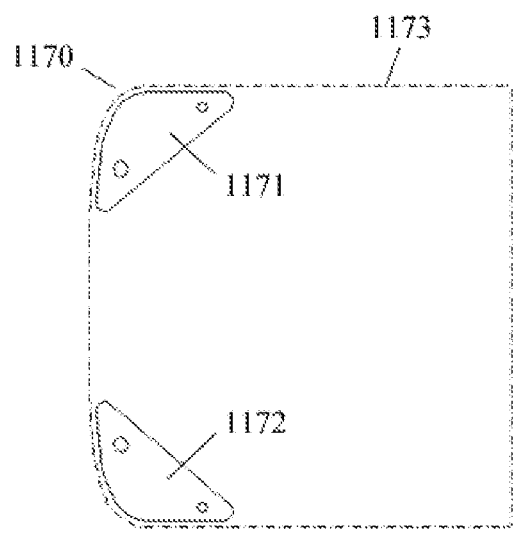
Figure 11L:
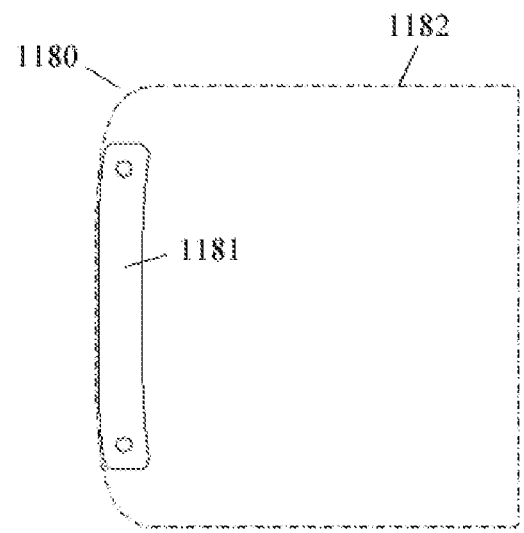

FIGS. 11I-K are possible examples of support structures embodiments comprising a plurality of reinforcing members. FIG. 11I support structure 1150 comprises two reinforcing members 1151 and 1152 arranged to provide support around most of the elastomeric material body perimeter 1154. The interior opening 1153 between reinforcing members 1151 and 1152 has a plan view area similar to interior aperture 1102 of reinforcing member 1101.

Support structure 1160 comprises three reinforcing members 1161-1163 arranged in a u-shape within the elastomeric material body perimeter 1169 as illustrated in FIG. 11J. Reinforcing member 1161 has two apertures for press fit threaded inserts. Reinforcing members 1162 and 1163 span fastener holes 1164-1165 and 1167-1168 respectively along opposing sides of the footpad. The ends of reinforcing members 1162 and 1163 engage a portion of adjacent installed fasteners and thereby restrict reinforcing member movement. The open end of u-shaped support structure 1160 faces the footpad front. FIG. 11K illustrates a support structure 1170 comprising two reinforcing members 1171 and 1172 in the back corners and located within the elastomeric material body perimeter 1173. Support structure 1170 reinforces a portion of the footpad kick which is typically the thickest elastomeric material body portion.

Support structure 1180 (FIG. 11L) comprises a single reinforcing element 1181 along only a portion of the footpad back and within the elastomeric material body perimeter 1182. Support structure 1180 reinforces the thick footpad kick portion similar to support structures 1170.

In other embodiments the support structure may comprise a single reinforcing member or a plurality of reinforcing members of different sizes, shapes and proximities to portions of the elastomeric material body perimeter.

Figure 12A:
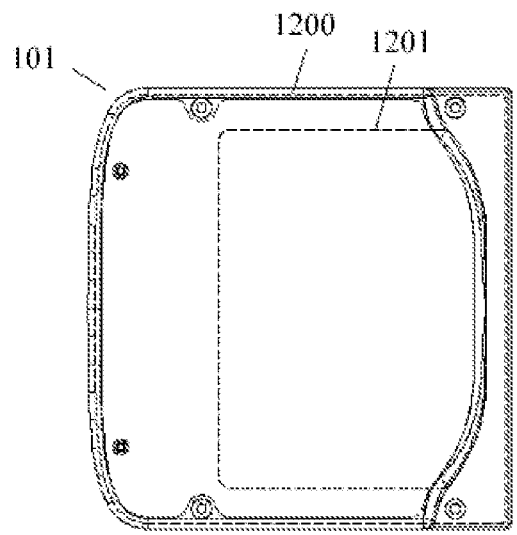
FIGS. 12A-D are top views of a single reinforcing member support structure embodiment intersecting an imaginary plan view region.

FIGS. 12A-D explain a method of quantifying the degree to which the elastomeric material body perimeter is supported by the support structure. FIG. 12A is a top view of a preferred embodiment footpad 101 and support structure 1100 depicted by hidden lines 1200 and 1201. The support structure is said to have a plan view region comprising all visible and hidden reinforcing member plan views. Support structure 1100 plan view region is the portion between hidden lines 1200 and 1201.

Figure 12B:
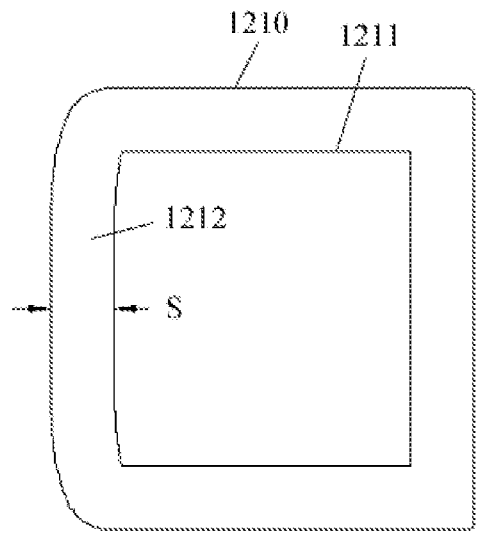

FIG. 12B illustrates footpad 101 elastomeric material body plan view perimeter 1210 and an inner boundary 1211 offset from the body plan view perimeter by a dimension S equal to the lesser of 38.1 mm (1.5 in) or 15% of the body plan view minor dimension. Referring back to FIG. 10, the minor dimension of footpad 101 is the length L and 15% of 230.8 mm (9.09 in) minor dimension is 34.6 mm (1.36 in). Dimension S in FIG. 12B is therefore equal to 34.6 mm (1.36 in). The imaginary plan view region 1212 between the body plan view perimeter 1210 and inner boundary 1211 has a plan view area of 271.6 cm$^2$ (42.1 in$^2$).

Figure 12C:
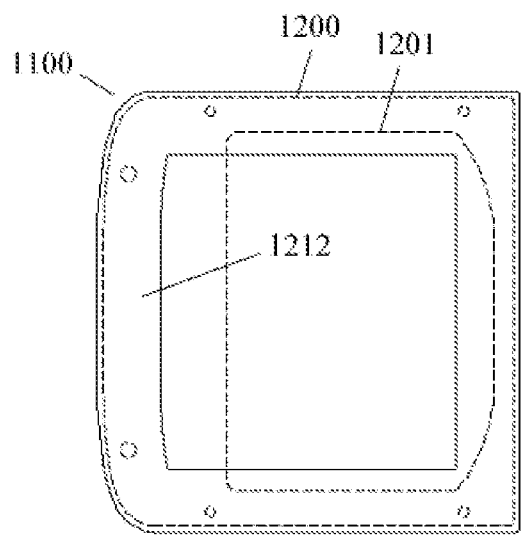

FIG. 12C illustrates imaginary plan view region 1212 superimposed over the support structure 1100 plan view region between hidden lines 1200 and 1201. The intersection of support structure 1100 plan view region and imaginary plan view region 1212, shaded region 1220 in FIG. 12D, has an area of 177.2 cm$^2$ (27.5 in$^2$).

Figure 12D:
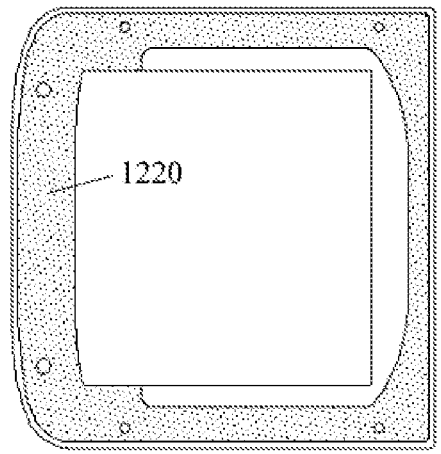

The elastomeric material body perimeter support attributed to the support structure is a function of the support structure plan view region intersection with the imaginary plan view region. For example, the percentage of the imaginary plan view region intersected by the support structure plan view region can be calculated as the intersection area divided by the imaginary plan view region area times 100. Referring to FIGS. 12B and 12D, support structure 1100 plan view intersects 177.2 cm$^2$/271.6 cm$^2$×100=65.2% of the imaginary plan view region. In other embodiments the support structure plan view region may intersect between 15% and 100% of the imaginary plan view region.

FIGS. 13A-D illustrate the degree to which other support structure examples presented herein support the elastomeric material body perimeter of footpad 101. The intersection of support structure 1120 plan view region (FIG. 11D) with imaginary plan view region 1212 is shaded region 1300 (FIG. 13A) which has an area of 143.3 cm$^2$ (22.2 in$^2$). Support structure 1120 plan view region intersects 143.3 cm$^2$/271.6 cm$^2$×100=52.7% of the imaginary plan view region 1212.

Figure 13A:
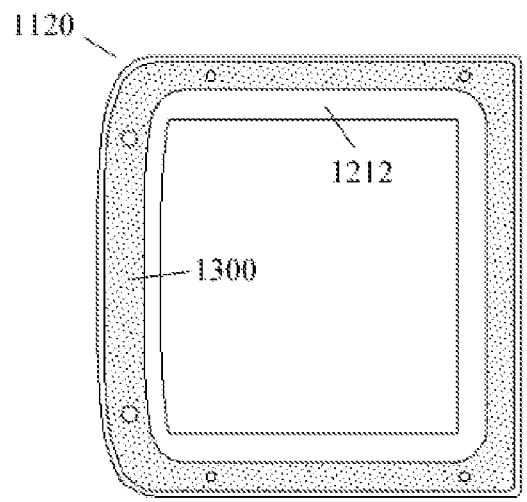
FIGS. 13A-D are top views of support structure embodiments intersecting an imaginary plan view region.
Figure 13B:
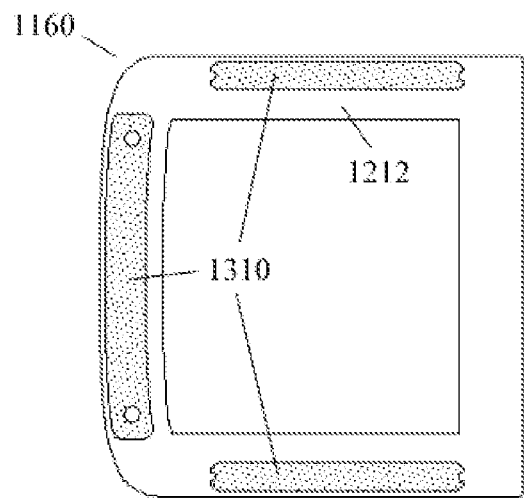

Referring to FIG. 13B, the intersection of support structure 1160 plan view region (FIG. 11J) with imaginary plan view region 1212 is shaded region 1310 which has a total area of 82.1 cm$^2$ (12.7 in$^2$). Support structure 1160 plan view region intersects 82.1 cm$^2$/271.6 cm$^2$×100=30.2% of the imaginary plan view region 1212.

Figure 13C:
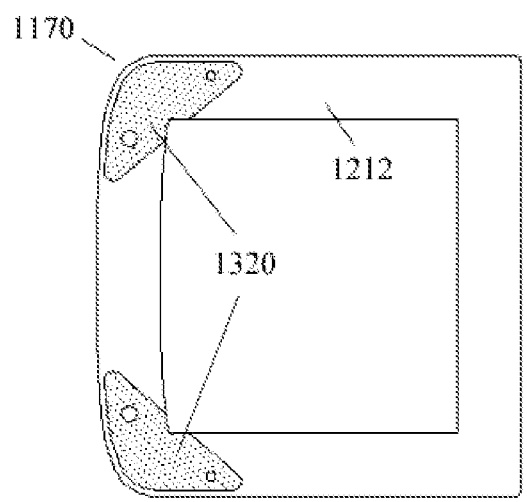

Referring to FIG. 13C, the intersection of support structure 1170 plan view region (FIG. 11K) with imaginary plan view region 1212 is shaded region 1320 which has a total area of 48.4 cm$^2$ (7.5 in$^2$). Support structure 1170 plan view region intersects 48.4 cm$^2$/271.6 cm$^2$×100=17.8% of the imaginary plan view region 1212.

Figure 13D:
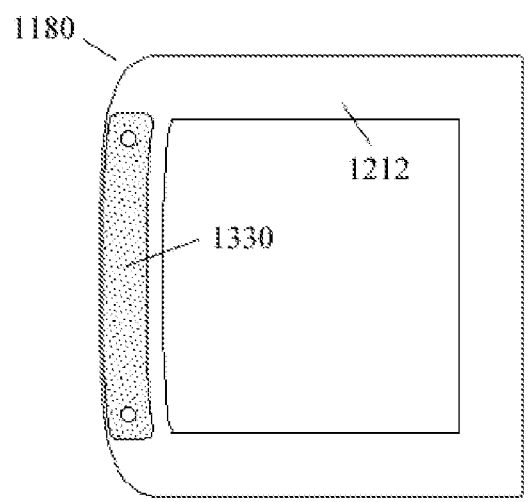

And lastly, referring to FIG. 13D, the intersection of support structure 1180 plan view region (FIG. 11L) with imaginary plan view region 1212 is shaded region 1330 which has an area of 41.5 cm$^2$ (6.4 in$^2$). Support structure 1180 plan view region intersects 41.5 cm$^2$/271.6 cm$^2$×100=15.3% of the imaginary plan view region 1212.

Figure 14:
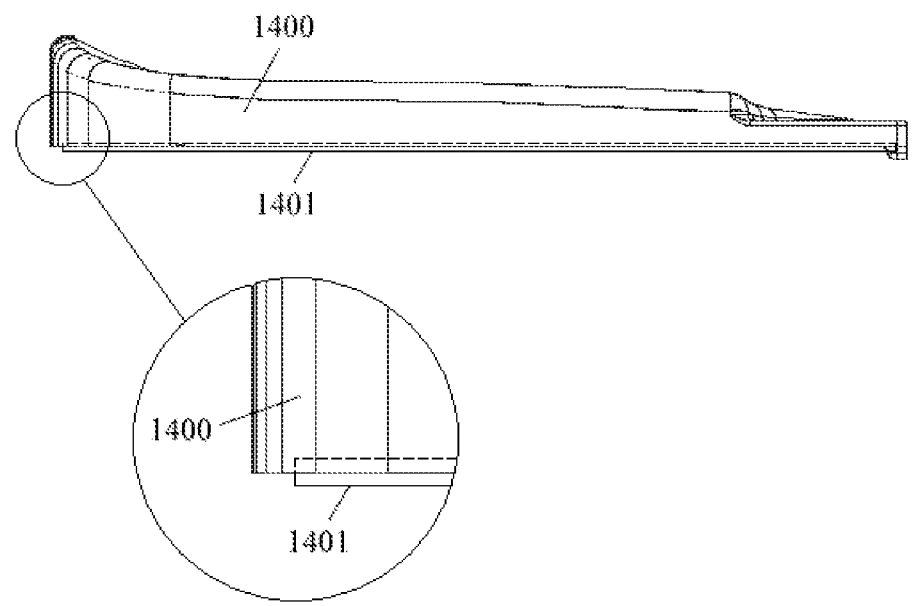
FIG. 14 is a side view of a footpad embodiment depicting a portion of the support structure embedded in the elastomeric material body.

In other embodiments a portion of the support structure 1401 may be embedded in the elastomeric material body 1400 as illustrated in the enlarged detail of FIG. 14. A portion of support structure 1401 may be embedded in the elastomeric material body during the elastomeric material casting or injection process or may be subsequently bonded into a recess in the elastomeric material body. In other embodiments the bottom surface of the support structure may be flush with the footpad bottom surface.

Figure 15:
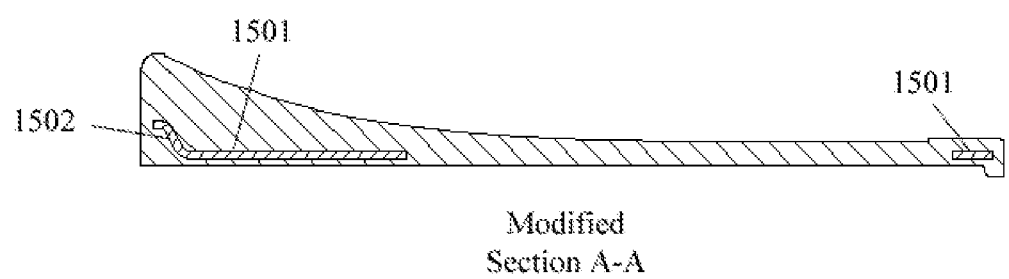
FIG. 15 is a cross section view of a footpad embodiment depicting a non planar support structure.

In other embodiments the support structure may comprise a curved or contoured portion. For example, support structure 1501 comprises an upturned end 1502 near the footpad rear as depicted in the modified Section A-A view in FIG. 15. In other embodiments the support structure may have only planar portions, a combination of planar and non-planar portions, or only non-planar portions.

Figure 16:
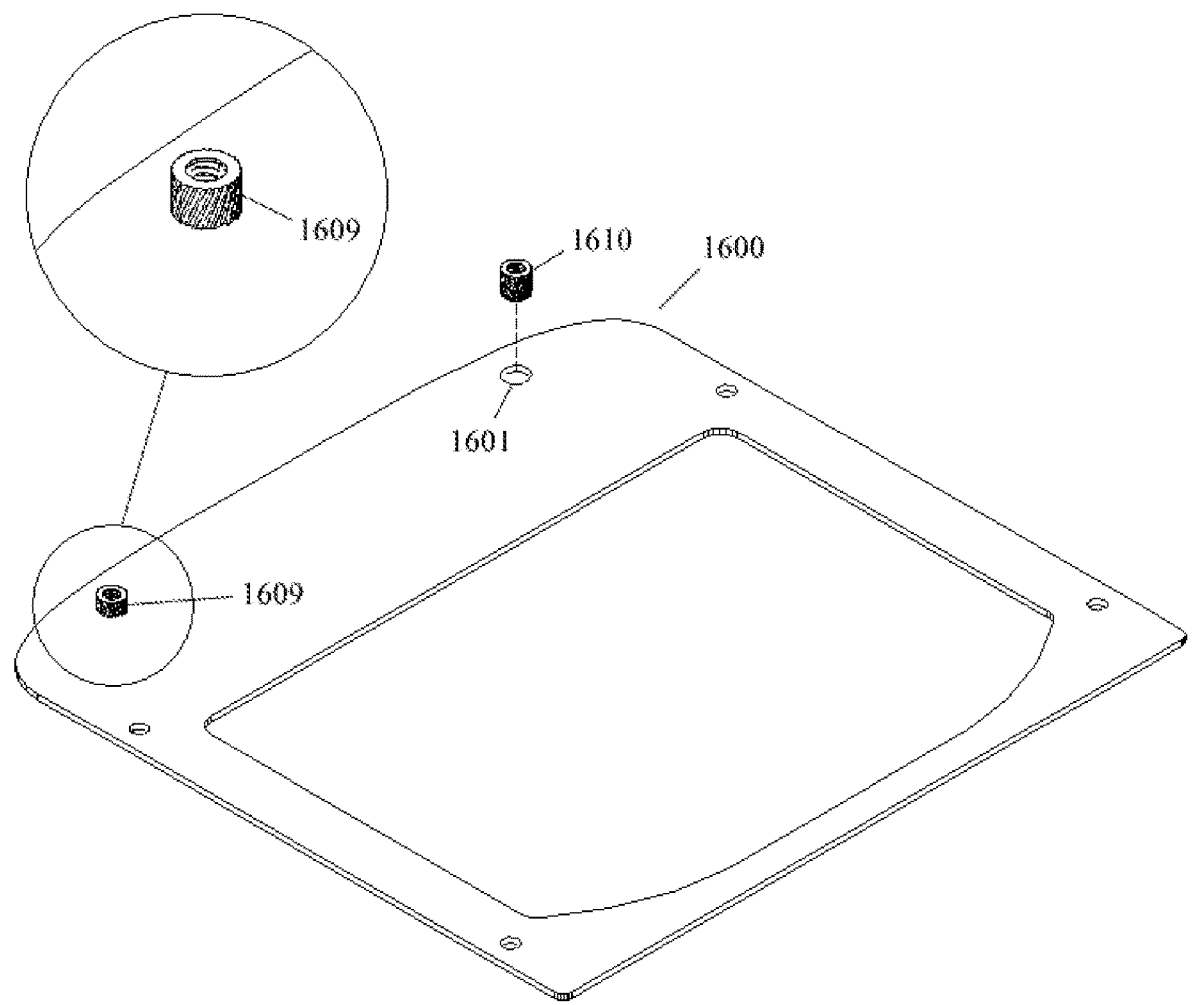
FIG. 16 is an isometric view of a single reinforcing member support structure embodiment depicting press fit threaded inserts.

In a preferred embodiment threaded inserts 1609 and 1610 are press fit into support structure 1600 to provide a strong attachment point for fasteners passing through the vehicle mounting surface and screwing in the footpad bottom (FIG. 16).

Figure 17:
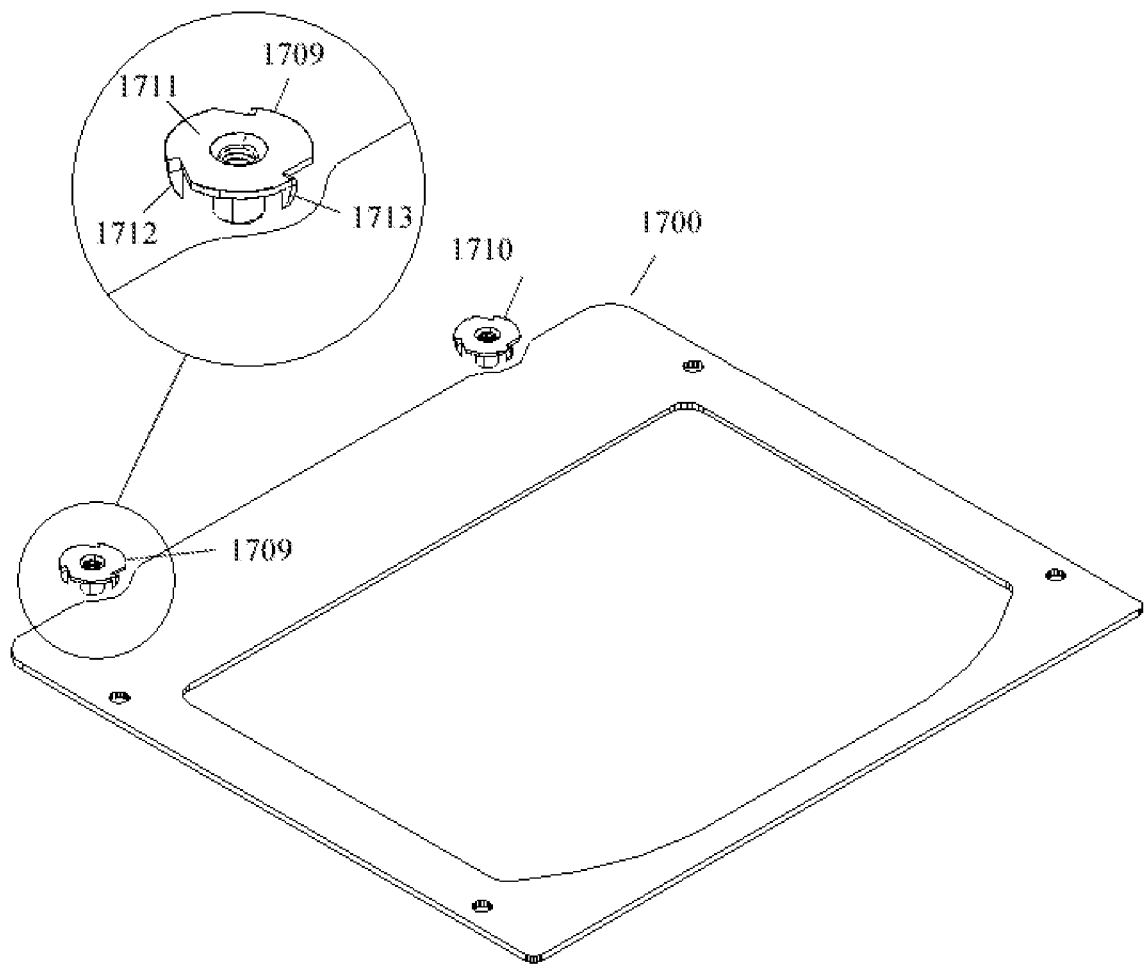
FIG. 17 is an isometric view of a single reinforcing member support structure embodiment and adjacent T-Nut threaded members.

In other embodiments, as illustrated in FIG. 17, threaded members such as T-Nuts 1709 and 1710 may be located adjacent to a support structure 1700 in the mold cavity prior to casting or injecting the elastomeric material. The T-Nuts provide strong attachment points for fasteners screwing into the elastomeric material body bottom. The T-Nut large head 1711 resists pullout and the wings 1712 and 1713 (third wing not shown) resist rotation during fastener installation. In other embodiments threaded apertures in the elastomeric material body may provide sufficient fastener retention strength.

Figure 18:
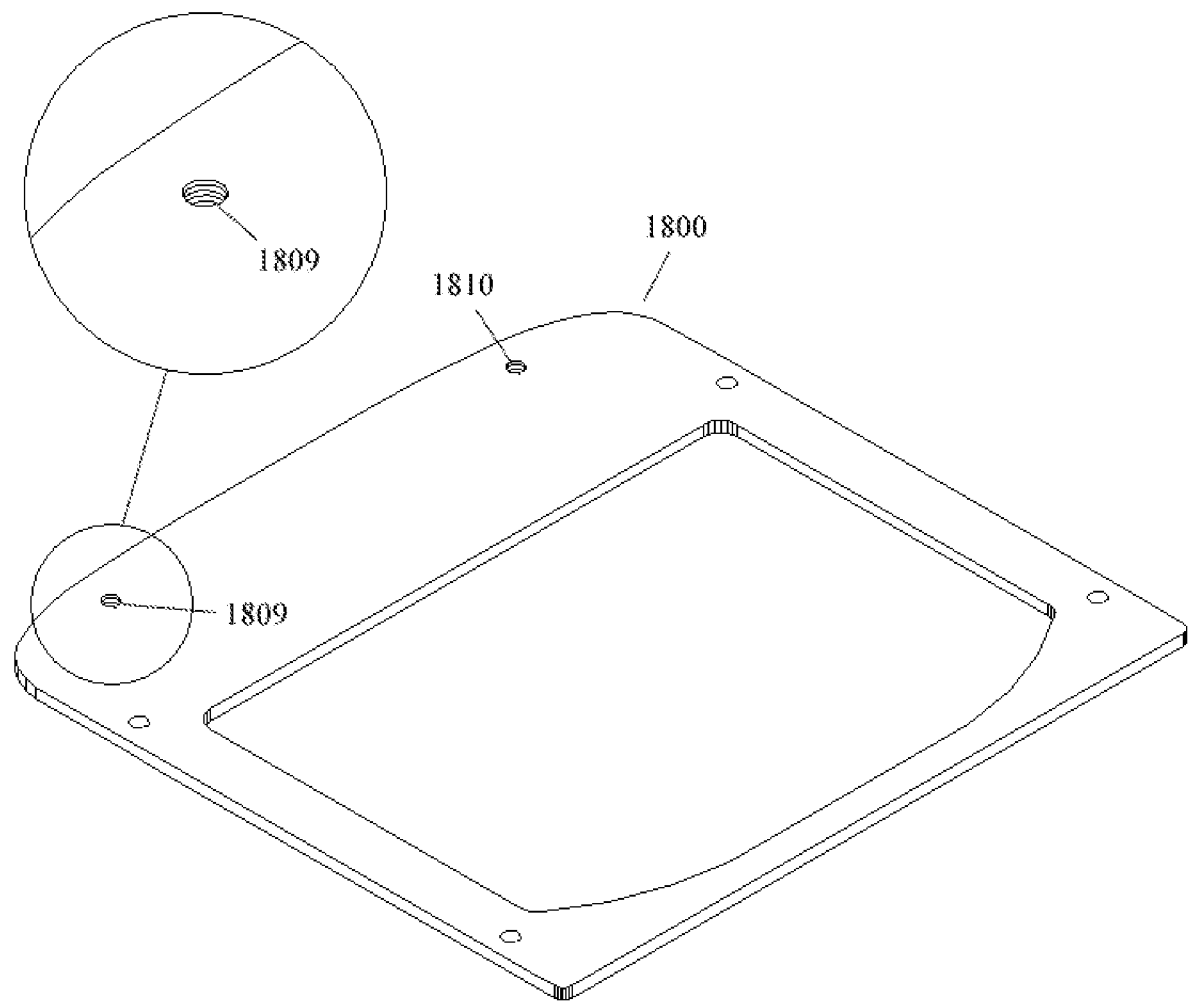
FIG. 18 is an isometric view of a single reinforcing member support structure embodiment depicting threaded fastener apertures.

In other embodiments a portion of a support structure 1800 may be of sufficient thickness to comprise threaded fastener apertures 1809-1810 (FIG. 18).

Figure 19:
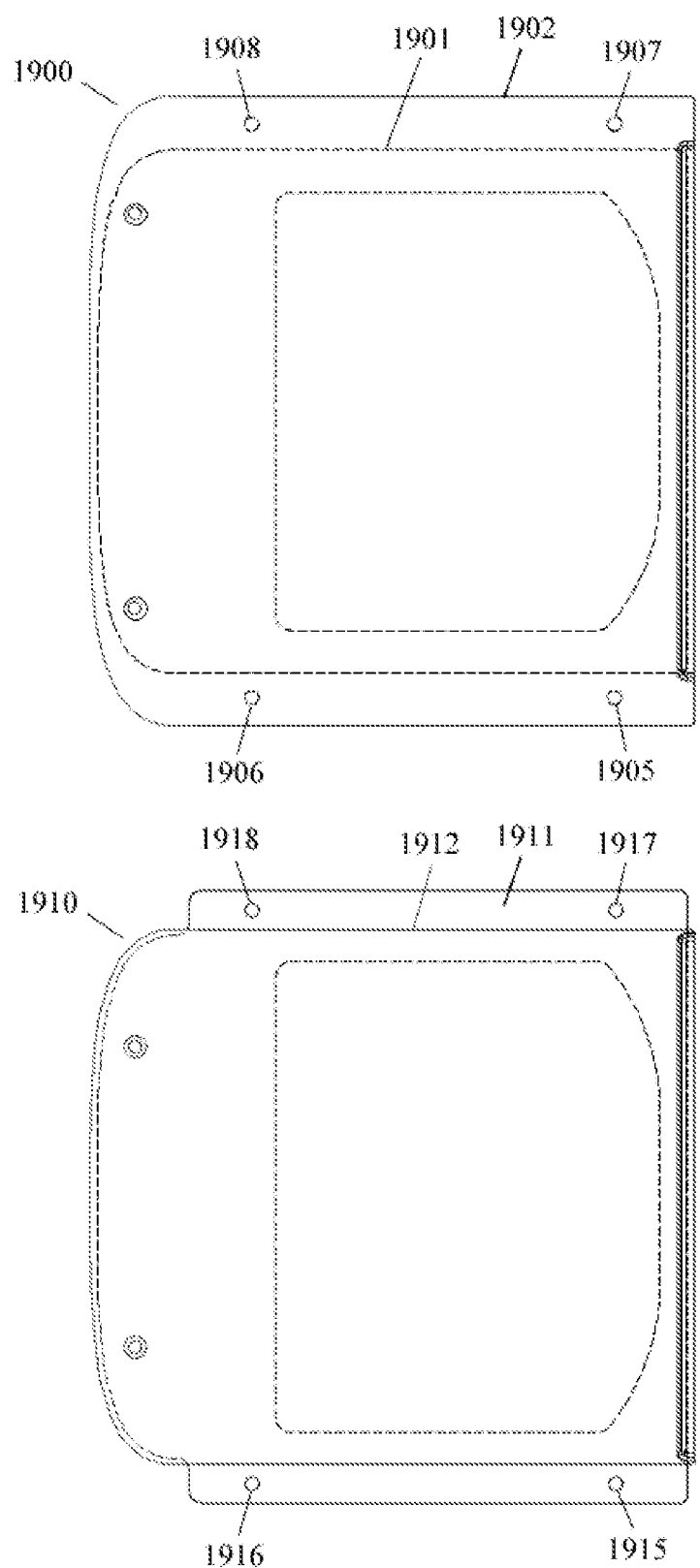
FIG. 19 is a bottom view of footpad embodiments.

In other embodiments a portion of a support structure may be inset from the elastomeric material body perimeter such that fastener apertures pass through the elastomeric material body some distance away from the support structure as illustrated in the example of footpad 1900, the single reinforcing member support structure depicted by dashed line 1901, the elastomeric material body perimeter 1902, and fastener apertures 1905-1908 as illustrated in the FIG. 19 footpad bottom view.

In other embodiments, with continued reference to FIG. 19 and footpad 1910, a portion of a support structure 1911 may extend beyond the elastomeric material body plan view perimeter 1912 and comprise fastener apertures 1915-1918 passing through only a support structure reinforcing member.

In other embodiments comprising a support structure with at least one reinforcing member, the footpad may be affixed to the self-balancing vehicle using at least one fastener passing through a fastener aperture in the elastomeric material body or the at least one reinforcing member or both the elastomeric material body and the at least one reinforcing member.

Figure 20A:
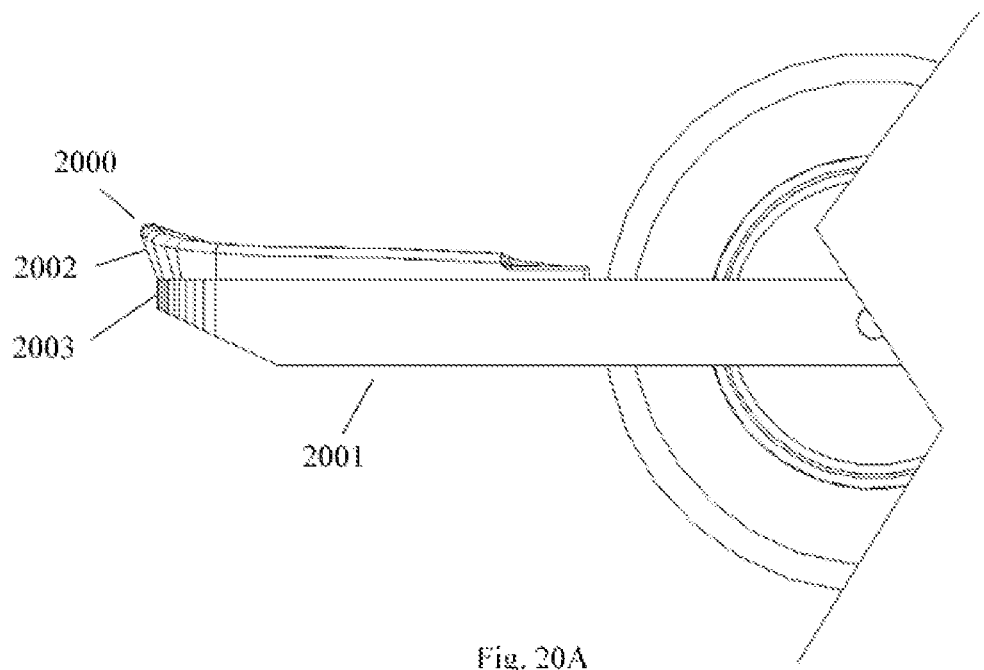
FIG. 20A is a side view of a footpad embodiment affixed to a self-balancing vehicle.
Figure 20B:
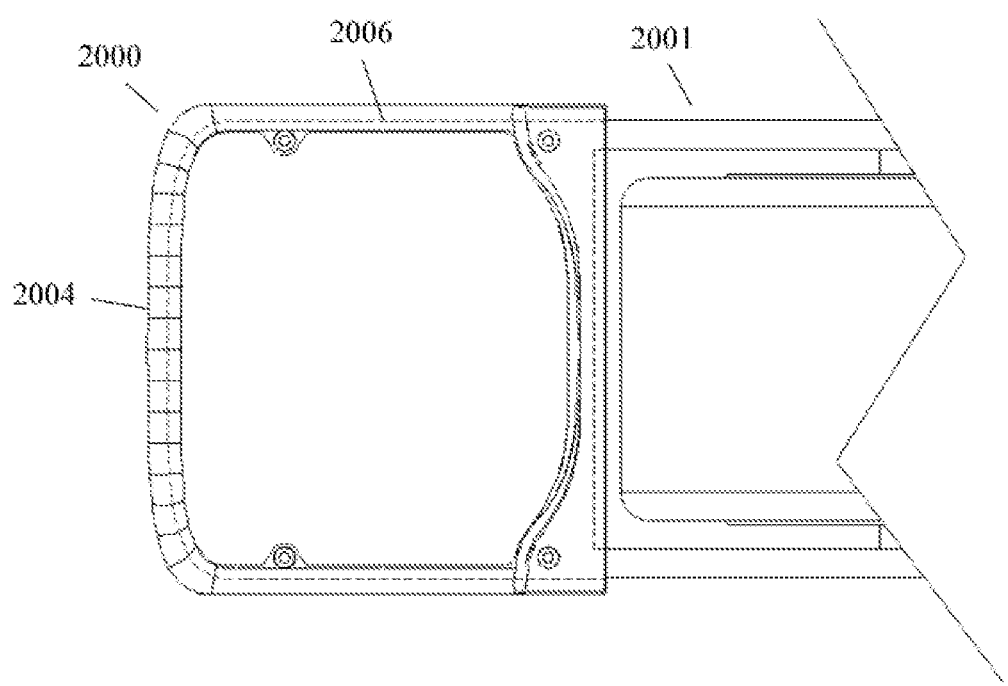
FIG. 20B is a top view of a footpad embodiment affixed to a self-balancing vehicle.

Referring to FIG. 20A, footpad 2000 is shown mounted on self-balancing vehicle 2001. The footpad elastomeric material body 2002 extends beyond the self-balancing vehicle frame end 2003. The elastomeric material body also extends beyond the self-balancing vehicle frame sides as shown in FIG. 20B. A portion of footpad 2000 elastomeric material body plan view perimeter 2004 lies outside of the self-balancing vehicle frame plan view perimeter 2006. In other embodiments different portions of the footpad elastomeric material body may lie outside the self-balancing vehicle frame plan view perimeter.

In other embodiments the elastomeric material body may be comprised of a plurality of components. The elastomeric material body components and support structure may be bonded or fastened together to form the footpad. In other embodiments the elastomeric material body components and support structure may be assembled into a footpad and may be held together with fasteners used to affix the footpad assembly to the vehicle.

The invention claimed is:

1. A footpad for a self-balancing vehicle, the footpad comprising a top surface nearest a rider's foot, a bottom surface nearest the self-balancing vehicle and a thickness between the top and bottom surfaces, the footpad further comprising:
a body comprising an elastomeric material having a durometer between 20 Shore OO and 90 Shore A, the elastomeric material body having a plan view perimeter and a plan view minor dimension;
a support structure comprising at least one reinforcing member, the at least one reinforcing member comprising a material having a Modulus of Elasticity greater than the Modulus of Elasticity of the elastomeric material;
the support structure comprising at least one interior aperture, said interior aperture having a plan view area, wherein only the elastomeric material is disposed through the entire thickness of the footpad within said plan view area;
wherein said interior aperture plan view area is at least 5.0 square inches; and
at least a portion of the support structure is embedded in the elastomeric material body.

2. The footpad of claim 1, wherein the elastomeric material durometer is between 10 Shore A and 80 Shore A.

3. The footpad of claim 2, wherein the elastomeric material durometer is between 35 Shore A and 65 Shore A.

4. The footpad of claim 1, wherein the elastomeric material comprises a natural rubber or a synthetic rubber.

5. The footpad of claim 4, wherein the elastomeric material comprises a polyurethane rubber.

6. The footpad of claim 1, wherein the support structure is completely embedded in the elastomeric material body.

7. The footpad of claim 1, wherein the at least one reinforcing member material Modulus of Elasticity is greater than five times the Modulus of Elasticity of the elastomeric material.

8. The footpad of claim 1, wherein the at least one reinforcing member further comprises a thickness in the range of 0.02 inches to 0.50 inches.

9. The footpad of claim 1, wherein the footpad further comprises a front edge and at least a portion of the footpad along the front edge protrudes below the bottom surface.

10. The footpad of claim 1, wherein the footpad further comprises at least one fastener aperture through the elastomeric material body or at least one of the at least one reinforcing member or both the elastomeric material body and at least one of the at least one reinforcing member.

11. The footpad of claim 10, wherein the footpad comprises at least two fastener apertures and a portion of at least one of the at least one reinforcing member spans the distance between two fastener apertures.

12. The footpad of claim 1, wherein the elastomeric material body further comprises at least one threaded member configured to receive a fastener.

13. The footpad of claim 1, wherein the at least one reinforcing member further comprises a threaded aperture or a threaded configured to receive a fastener.

14. The footpad of claim 1, wherein the top surface is textured or a textured layer is affixed to the top surface.

15. The footpad of claim 1, wherein at least one of the at least one reinforcing member comprises a material capable of undergoing plastic deformation.

16. The footpad of claim 1, wherein the self-balancing vehicle comprises a frame having a plan view perimeter, at least a portion of the elastomeric material body plan view perimeter lies outside of the frame plan view perimeter.

17. A footpad for a self-balancing vehicle, the footpad comprising a top surface nearest a rider's foot, a bottom surface nearest the self-balancing vehicle and a thickness between the top and bottom surfaces, the footpad further comprising:
a body comprising an elastomeric material having a durometer between 20 Shore and −90 Shore A;
a support structure comprising at least one reinforcing member, the at least one reinforcing member comprising a material having a Modulus of Elasticity greater than five times the Modulus of Elasticity of the elastomeric material;
at least a portion of the support structure is embedded in the elastomeric material body; and
at least one interior portion comprising a plan view area and only the elastomeric material
through the footpad thickness, the sum of all interior portion plan view areas is at least 5.0 square inches.

18. A footpad for a self-balancing vehicle, the footpad comprising:
a body comprising an elastomeric material having a durometer between 20 Shore OO and 90 Shore A, the elastomeric material body having a plan view perimeter and a plan view minor dimension;
a support structure comprising at least one reinforcing member, the at least one reinforcing member comprising a material having a Modulus of Elasticity greater than five times the Modulus of Elasticity of the elastomeric material;
at least a portion of the support structure is embedded in the elastomeric material body;
the support structure having a plan view region comprising all visible and hidden reinforcing member plan views, the support structure plan view region intersects at least 20% of an imaginary plan view region between the elastomeric material body plan view perimeter and an inner boundary offset from the elastomeric material body plan view perimeter by the lesser of 1.5 inches or 15% of the elastomeric material body plan view minor dimension, wherein said inner boundary defines an opening in said support structure; and
at least one fastener aperture through the elastomeric material body or at least one of the at least one reinforcing member or both the elastomeric material body and at least one of the at least one reinforcing member.

* * * * *